US012649246B1

(12) United States Patent
Webb et al.

(10) Patent No.: US 12,649,246 B1
(45) Date of Patent: Jun. 9, 2026

(54) HUMANOID ROBOT WITH AN ANKLE REGION

(71) Applicant: Figure AI Inc., Sunnyvale, CA (US)

(72) Inventors: Jacob Webb, Sunnyvale, CA (US);
Joseph Wood, Sunnyvale, CA (US);
Shubham Jayprakash Chotia,
Sunnyvale, CA (US); **Vadim
Chernyak**, Sunnyvale, CA (US)

(73) Assignee: FIGURE AI INC., San Jose, CA (US)

( * ) Notice: Subject to any disclaimer, the term of this
patent is extended or adjusted under 35
U.S.C. 154(b) by 9 days.

(21) Appl. No.: 18/914,800

(22) Filed: Oct. 14, 2024

Related U.S. Application Data

(63) Continuation-in-part of application No. 18/904,332,
filed on Oct. 2, 2024.

(60) Provisional application No. 63/626,039, filed on Feb.
21, 2024, provisional application No. 63/626,035,
filed on Feb. 27, 2024, provisional application No.
63/564,741, filed on Mar. 13, 2024, provisional
application No. 63/626,034, filed on Mar. 13, 2024,
provisional application No. 63/626,037, filed on May
28, 2024, provisional application No. 63/706,768,
filed on Oct. 14, 2024.

(51) Int. Cl.
*B25J 17/00* (2006.01)
*B62D 57/032* (2006.01)

(52) U.S. Cl.
CPC ............ *B25J 17/00* (2013.01); *B62D 57/032*
(2013.01)

(58) Field of Classification Search
CPC ....... B25J 11/0015; B25J 9/0009; B25J 19/00
See application file for complete search history.

(56) References Cited

U.S. PATENT DOCUMENTS

| 552,557 | A | 1/1896 | Weber |
| 1,290,140 | A | 1/1919 | Elleby |
| 2,362,597 | A | 11/1944 | Vince |
| 3,060,445 | A | 10/1962 | Brockman |
| | | (Continued) | |

FOREIGN PATENT DOCUMENTS

| CA | 137209 | 5/2011 |
| CN | 102357889 | 2/2012 |
| | (Continued) | |

OTHER PUBLICATIONS

Han et al., Mechanical design of robot lower body based on four-bar
linkage structure for energy efficient bipedal walking, 2016, IEEE,
p. 402-407 (Year: 2016).*

(Continued)

*Primary Examiner* — Mcdieunel Marc

(57) ABSTRACT

A humanoid robot includes an upper region, a lower region,
and a central region. The upper region includes a head, a
torso, and a pair of arms coupled to the torso. The lower
region is spaced apart from the upper region and includes a
pair of legs. The lower region of the robot includes left and
right ankle assemblies configured to control a pitch move-
ment and a roll movement of left and right feet of the
humanoid robot. Each ankle assembly can include a foot-roll
actuator assembly and a foot-roll actuator assembly. The
foot-roll actuator assembly is coupled to the foot and to the
foot-flexion actuator. The foot-roll actuator assembly is
configured to control roll movement of each respective foot
relative to both a shin of each leg and the foot-flexion
actuator assembly.

25 Claims, 22 Drawing Sheets

(56)　　　　　References Cited

U.S. PATENT DOCUMENTS

| | | | | |
|---|---|---|---|---|
| 3,458,864 | A | 8/1969 | Austin | |
| 4,804,220 | A | 2/1989 | Rosheim | |
| 4,834,761 | A | 5/1989 | Walters | |
| 4,986,723 | A | 1/1991 | Maeda | |
| 5,394,766 | A | 3/1995 | Johnson | |
| 5,447,403 | A | 9/1995 | Engler, Jr. | |
| 5,673,367 | A | 9/1997 | Buckley | |
| 6,477,058 | B1 | 11/2002 | Luebs | |
| D476,404 | S | 6/2003 | Chen | |
| 6,732,015 | B2 | 5/2004 | Maeda | |
| 6,901,313 | B2 * | 5/2005 | Mori | G06N 20/00 |
| | | | | 700/262 |
| 6,980,889 | B2 | 12/2005 | Ito | |
| 7,024,276 | B2 | 4/2006 | Ito | |
| 7,031,806 | B2 * | 4/2006 | Kuroki | G06N 3/008 |
| | | | | 901/1 |
| 7,072,741 | B2 | 7/2006 | Nagashima | |
| 7,099,747 | B2 | 8/2006 | Mikami | |
| 7,113,849 | B2 * | 9/2006 | Kuroki | B62D 57/032 |
| | | | | 901/1 |
| 7,308,336 | B2 | 12/2007 | Takenaka | |
| 7,319,918 | B2 | 1/2008 | Takenaka | |
| 7,379,789 | B2 | 5/2008 | Takenaka | |
| 7,386,364 | B2 | 6/2008 | Mikami | |
| 7,664,569 | B2 | 2/2010 | Shimizu | |
| D631,612 | S | 1/2011 | Tajima | |
| 7,864,159 | B2 | 1/2011 | Sweetser | |
| D641,808 | S | 7/2011 | Matsuda | |
| 8,224,652 | B2 | 7/2012 | Wang | |
| D668,758 | S | 10/2012 | Hall | |
| D677,743 | S | 3/2013 | Koshiishi | |
| D687,908 | S | 8/2013 | Hoang | |
| 8,511,964 | B2 | 8/2013 | Linn | |
| D689,566 | S | 9/2013 | Wong | |
| 8,660,695 | B2 | 2/2014 | De La Rosa Tames | |
| 8,770,749 | B2 | 7/2014 | Mccabe | |
| D712,598 | S | 9/2014 | Mehra | |
| 8,942,849 | B2 | 1/2015 | Maisonnier | |
| D732,999 | S | 6/2015 | Siegel | |
| 9,134,547 | B2 | 9/2015 | Mccabe | |
| 9,205,556 | B1 | 12/2015 | Magnusson | |
| 9,205,560 | B1 | 12/2015 | Edsinger | |
| 9,302,393 | B1 | 4/2016 | Rosen | |
| 9,346,165 | B1 | 5/2016 | Metzger | |
| 9,494,415 | B2 | 11/2016 | Sweetser | |
| 9,569,976 | B2 | 2/2017 | Krauss | |
| 9,574,646 | B1 | 2/2017 | Edsinger | |
| 9,575,335 | B1 | 2/2017 | Mccabe | |
| 9,592,603 | B2 | 3/2017 | Hardouin | |
| 9,669,280 | B2 | 6/2017 | Hua | |
| D794,692 | S | 8/2017 | Haranaka | |
| D795,320 | S | 8/2017 | Liu | |
| D795,321 | S | 8/2017 | Liu | |
| 9,789,607 | B1 | 10/2017 | Whitman | |
| 9,789,612 | B2 | 10/2017 | Hoffman | |
| 9,796,078 | B2 | 10/2017 | Angle | |
| 9,821,466 | B2 | 11/2017 | Bingham | |
| 9,842,585 | B2 | 12/2017 | Huang | |
| 9,868,210 | B1 | 1/2018 | Whitman | |
| 9,992,474 | B2 | 6/2018 | Grunnet-Jepsen | |
| 10,007,994 | B2 | 6/2018 | Grunnet-Jepsen | |
| 10,018,256 | B1 | 7/2018 | Magnusson | |
| D831,308 | S | 10/2018 | Lu | |
| D835,214 | S | 12/2018 | Xiong | |
| D838,759 | S | 1/2019 | Kowalski | |
| 10,189,158 | B2 | 1/2019 | Edsinger | |
| D841,708 | S | 2/2019 | Koshiishi | |
| 10,203,209 | B2 | 2/2019 | Roumeliotis | |
| 10,310,362 | B2 | 6/2019 | Grunnet-Jepsen | |
| 10,349,245 | B2 | 7/2019 | Tokuchi | |
| D856,593 | S | 8/2019 | Burke | |
| D866,684 | S | 11/2019 | Früh | |
| D868,866 | S | 12/2019 | Gable | |
| D872,152 | S | 1/2020 | Xiong | |
| D873,320 | S | 1/2020 | Clerc | |
| 10,532,464 | B1 | 1/2020 | Guzman | |
| 10,537,998 | B2 | 1/2020 | Salisbury | |
| 10,545,497 | B1 | 1/2020 | Cui | |
| 10,571,896 | B2 | 2/2020 | Benaim | |
| D885,451 | S | 5/2020 | Chen | |
| D888,120 | S | 6/2020 | Hurst | |
| D892,886 | S | 8/2020 | Klassen | |
| D892,887 | S | 8/2020 | Klassen | |
| D893,573 | S | 8/2020 | Yan | |
| 10,780,578 | B2 | 9/2020 | Blankespoor | |
| D898,789 | S | 10/2020 | Nazarikhorram | |
| 10,890,921 | B2 | 1/2021 | Gillett | |
| D911,459 | S | 2/2021 | Xiong | |
| 10,921,558 | B2 | 2/2021 | Yao | |
| 10,924,638 | B2 | 2/2021 | Swaminathan | |
| 10,946,528 | B2 | 3/2021 | Gupta | |
| 10,960,539 | B1 | 3/2021 | Kalakrishnan | |
| 10,988,192 | B1 * | 4/2021 | Thorne | B62D 57/032 |
| D918,979 | S | 5/2021 | Mullan | |
| D921,081 | S | 6/2021 | Laplante | |
| D932,531 | S | 10/2021 | Xu | |
| 11,180,205 | B2 | 11/2021 | Amino | |
| 11,188,821 | B1 | 11/2021 | Kalakrishnan | |
| 11,200,816 | B2 | 12/2021 | Wang | |
| 11,247,738 | B2 | 2/2022 | Lavalley | |
| 11,292,126 | B2 * | 4/2022 | Christensen | B25J 19/02 |
| 11,333,954 | B2 | 5/2022 | Bull | |
| 11,347,030 | B2 | 5/2022 | Yao | |
| 11,416,003 | B2 | 8/2022 | Whitman | |
| 11,435,745 | B2 | 9/2022 | Lee | |
| 11,498,223 | B2 | 11/2022 | Williams | |
| D972,815 | S | 12/2022 | Wang | |
| D975,363 | S | 1/2023 | Paulson | |
| 11,546,504 | B2 | 1/2023 | Kim | |
| 11,554,484 | B2 | 1/2023 | Jung | |
| 11,600,010 | B2 | 3/2023 | Doutre | |
| 11,602,853 | B2 | 3/2023 | Stoianovici | |
| 11,632,991 | B2 | 4/2023 | Hull | |
| D985,643 | S | 5/2023 | Li | |
| 11,645,444 | B2 | 5/2023 | Scheutz | |
| 11,686,884 | B2 | 6/2023 | Shinohara | |
| D991,347 | S | 7/2023 | Ding | |
| 11,699,884 | B2 | 7/2023 | Braun | |
| 11,707,852 | B1 | 7/2023 | Hurst | |
| 11,736,677 | B2 | 8/2023 | Grunnet-Jepsen | |
| 11,807,067 | B2 | 11/2023 | Mancini | |
| 11,833,680 | B2 | 12/2023 | Deits | |
| 11,850,738 | B2 | 12/2023 | Chernyak | |
| 11,851,120 | B2 | 12/2023 | Fay | |
| 11,924,023 | B1 | 3/2024 | Smith | |
| D1,024,427 | S | 4/2024 | Li | |
| 11,999,423 | B2 | 6/2024 | Whitman | |
| 12,036,670 | B2 | 7/2024 | Geating | |
| 12,054,208 | B2 | 8/2024 | Swilling | |
| 12,070,863 | B2 | 8/2024 | Whitman | |
| 12,077,229 | B2 | 9/2024 | Whitman | |
| 12,097,626 | B2 | 9/2024 | Ikeda | |
| 12,122,044 | B2 | 10/2024 | Webb | |
| D1,051,193 | S | 11/2024 | Mahoor | |
| 12,134,181 | B2 | 11/2024 | Klingensmith | |
| 12,172,537 | B2 | 12/2024 | Gonano | |
| 12,205,214 | B2 | 1/2025 | Starke | |
| 12,214,497 | B2 | 2/2025 | Whitman | |
| 12,235,652 | B2 | 2/2025 | Whitman | |
| 12,240,117 | B2 | 3/2025 | Chebotar | |
| 12,251,831 | B2 | 3/2025 | Murphy | |
| D1,069,875 | S | 4/2025 | Belon | |
| 12,263,591 | B1 | 4/2025 | Clerc | |
| 12,290,940 | B1 | 5/2025 | Abate | |
| D1,082,881 | S | 7/2025 | Wang | |
| D1,085,192 | S | 7/2025 | Abroff | |
| 12,365,094 | B2 | 7/2025 | Mccall | |
| 12,403,611 | B2 * | 9/2025 | McCall | B25J 11/0005 |
| 12,420,434 | B1 | 9/2025 | Goldsmith | |
| 12,447,628 | B1 * | 10/2025 | McCall | B25J 9/0009 |
| 12,472,648 | B1 | 11/2025 | Hadas | |
| D1,105,195 | S | 12/2025 | Liu | |
| 12,539,618 | B1 | 2/2026 | Mccall | |
| 2002/0157167 | A1 | 10/2002 | Paul | |

(56) References Cited

U.S. PATENT DOCUMENTS

| | | | |
|---|---|---|---|
| 2003/0070202 A1 | 4/2003 | Paul | |
| 2003/0120388 A1* | 6/2003 | Kuroki | G06N 3/008 |
| | | | 700/245 |
| 2004/0044417 A1 | 3/2004 | Finn | |
| 2004/0075168 A1 | 4/2004 | Azuma | |
| 2004/0103740 A1 | 6/2004 | Townsend | |
| 2005/0072558 A1 | 4/2005 | Whitney | |
| 2006/0217838 A1 | 9/2006 | Sugino | |
| 2007/0035143 A1 | 2/2007 | Blackwell | |
| 2008/0239678 A1 | 10/2008 | Ploeg | |
| 2008/0240889 A1 | 10/2008 | Yokoyama | |
| 2009/0059033 A1 | 3/2009 | Shimada | |
| 2010/0229663 A1 | 9/2010 | Wang | |
| 2010/0280662 A1 | 11/2010 | Abdallah | |
| 2011/0058800 A1 | 3/2011 | Lee | |
| 2011/0067517 A1 | 3/2011 | Ihrke | |
| 2011/0067520 A1 | 3/2011 | Ihrke | |
| 2011/0068595 A1 | 3/2011 | Ihrke | |
| 2011/0071671 A1 | 3/2011 | Ihrke | |
| 2011/0071673 A1 | 3/2011 | Ihrke | |
| 2011/0071678 A1 | 3/2011 | Ihrke | |
| 2011/0186362 A1 | 8/2011 | Alfayad | |
| 2012/0072215 A1 | 3/2012 | Yu | |
| 2012/0078419 A1 | 3/2012 | Kim | |
| 2012/0155775 A1 | 6/2012 | Ahn | |
| 2012/0215539 A1 | 8/2012 | Juneja | |
| 2012/0310412 A1 | 12/2012 | Seo | |
| 2013/0175816 A1 | 7/2013 | Kawasaki | |
| 2013/0345863 A1 | 12/2013 | Linder | |
| 2014/0039675 A1 | 2/2014 | Ead | |
| 2014/0132210 A1 | 5/2014 | Partovi | |
| 2014/0217762 A1 | 8/2014 | Ihrke | |
| 2014/0265401 A1 | 9/2014 | Allen Demers | |
| 2014/0279432 A1 | 9/2014 | Holman | |
| 2015/0192399 A1 | 7/2015 | Raab | |
| 2015/0290795 A1 | 10/2015 | Oleynik | |
| 2016/0008988 A1 | 1/2016 | Kennedy | |
| 2016/0052574 A1 | 2/2016 | Khripin | |
| 2016/0064263 A1 | 3/2016 | Hosek | |
| 2017/0028551 A1 | 2/2017 | Hemken | |
| 2017/0028563 A1 | 2/2017 | Hemken | |
| 2017/0032035 A1 | 2/2017 | Gao | |
| 2017/0075143 A1 | 3/2017 | Saylor | |
| 2017/0080582 A1 | 3/2017 | Mugnier | |
| 2017/0106738 A1 | 4/2017 | Gillett | |
| 2017/0125008 A1 | 5/2017 | Maisonnier | |
| 2017/0299898 A1 | 10/2017 | Gallina | |
| 2017/0326736 A1 | 11/2017 | Nagatsuka | |
| 2018/0104823 A1 | 4/2018 | Kaku | |
| 2018/0136912 A1 | 5/2018 | Venkataramani | |
| 2018/0182260 A1 | 6/2018 | Ciniello | |
| 2018/0186015 A1 | 7/2018 | Xiong | |
| 2018/0232201 A1 | 8/2018 | Holtmann | |
| 2018/0281179 A1 | 10/2018 | Michalakis | |
| 2018/0293517 A1 | 10/2018 | Browne | |
| 2018/0357552 A1 | 12/2018 | Campos | |
| 2019/0005374 A1 | 1/2019 | Shankar | |
| 2019/0025611 A1 | 1/2019 | Saylor | |
| 2019/0079924 A1 | 3/2019 | Sugiura | |
| 2019/0082811 A1 | 3/2019 | Gray | |
| 2019/0105783 A1 | 4/2019 | Al Moubayed | |
| 2019/0278079 A1 | 9/2019 | Mccabe | |
| 2019/0329413 A1 | 10/2019 | Johnson | |
| 2019/0337166 A1 | 11/2019 | Keeney-Ritchie | |
| 2019/0371307 A1 | 12/2019 | Zhao | |
| 2019/0374161 A1 | 12/2019 | Ly | |
| 2020/0009739 A1 | 1/2020 | Moon | |
| 2020/0086479 A1 | 3/2020 | Messier | |
| 2020/0180145 A1 | 6/2020 | Xiong | |
| 2020/0180146 A1 | 6/2020 | Xiong | |
| 2020/0180167 A1 | 6/2020 | Xiong | |
| 2020/0182336 A1 | 6/2020 | Xiong | |
| 2020/0182337 A1 | 6/2020 | Xiong | |
| 2020/0330246 A1 | 10/2020 | Tognetti | |
| 2020/0409183 A1 | 12/2020 | Saylor | |

| | | | |
|---|---|---|---|
| 2021/0146214 A1 | 5/2021 | Lim | |
| 2021/0162602 A1 | 6/2021 | Kawaguchi | |
| 2021/0387346 A1 | 12/2021 | Gillett | |
| 2022/0226996 A1 | 7/2022 | Ishizuka | |
| 2022/0227010 A1 | 7/2022 | Takabu | |
| 2022/0287853 A1 | 9/2022 | Ren | |
| 2022/0294062 A1 | 9/2022 | Kamon | |
| 2022/0388174 A1 | 12/2022 | Stathis | |
| 2022/0390952 A1 | 12/2022 | Yu | |
| 2022/0395974 A1 | 12/2022 | Balasubramanian | |
| 2022/0410380 A1 | 12/2022 | Lu | |
| 2023/0033779 A1 | 2/2023 | Gazeau | |
| 2023/0048725 A1 | 2/2023 | Barbour | |
| 2023/0112596 A1 | 4/2023 | Yang | |
| 2023/0143315 A1 | 5/2023 | Whitman | |
| 2023/0154055 A1 | 5/2023 | Besenbruch | |
| 2023/0173683 A1 | 6/2023 | Gomez | |
| 2023/0182296 A1 | 6/2023 | Sermanet | |
| 2023/0347514 A1 | 11/2023 | Xiao | |
| 2023/0390948 A1 | 12/2023 | Hsu | |
| 2024/0003380 A1 | 1/2024 | Vyas | |
| 2024/0044331 A1 | 2/2024 | Sterling | |
| 2024/0091964 A1 | 3/2024 | Smith | |
| 2024/0181637 A1 | 6/2024 | Gillett | |
| 2024/0217104 A1 | 7/2024 | Neville | |
| 2024/0228191 A1 | 7/2024 | Kumar | |
| 2024/0289606 A1 | 8/2024 | Wang | |
| 2024/0294219 A1 | 9/2024 | Gildert | |
| 2024/0299195 A1 | 9/2024 | Perry | |
| 2024/0300109 A1 | 9/2024 | Shaw | |
| 2024/0430464 A1 | 12/2024 | Kalva | |
| 2025/0042024 A1 | 2/2025 | Dijkman | |
| 2025/0050507 A1 | 2/2025 | Camasmie | |
| 2025/0131347 A1 | 4/2025 | Wells | |
| 2025/0147517 A1 | 5/2025 | Swilling | |
| 2025/0187202 A1 | 6/2025 | Mccall | |
| 2025/0196326 A1 | 6/2025 | Katz | |
| 2025/0196327 A1 | 6/2025 | Geating | |
| 2025/0205908 A1 | 6/2025 | Goldsmith | |
| 2025/0242500 A1 | 7/2025 | Mccall | |
| 2025/0269518 A1 | 8/2025 | Ragusila | |
| 2025/0312911 A1 | 10/2025 | Ragusila | |
| 2025/0319614 A1 | 10/2025 | Michael | |
| 2025/0322372 A1 | 10/2025 | Dana | |
| 2026/0027736 A1 | 1/2026 | Yeganeh | |
| 2026/0034678 A1 | 2/2026 | Mccall | |

FOREIGN PATENT DOCUMENTS

| | | | |
|---|---|---|---|
| CN | 302064216 S | 9/2012 | |
| CN | 308637925 | 5/2014 | |
| CN | 303298408 | 7/2015 | |
| CN | 304998646 S | 1/2019 | |
| CN | 305154358 S | 5/2019 | |
| CN | 209615545 | 11/2019 | |
| CN | 210998685 | 7/2020 | |
| CN | 212287717 | 1/2021 | |
| CN | 112959343 | 6/2021 | |
| CN | 306894068 S | 10/2021 | |
| CN | 114147745 | 3/2022 | |
| CN | 114147745 A | 3/2022 | |
| CN | 115503013 | 12/2022 | |
| CN | 115649316 | 1/2023 | |
| CN | 218802294 | 4/2023 | |
| CN | 116714698 | 9/2023 | |
| CN | 117047810 | 11/2023 | |
| CN | 117301022 | 12/2023 | |
| CN | 117462367 | 1/2024 | |
| CN | 308675468 S | 6/2024 | |
| CN | 308157136 S | 8/2024 | |
| CN | 309012925 | 12/2024 | |
| CN | 309180560 S | 3/2025 | |
| DE | 3345607 A1 | 6/1985 | |
| DE | 112018003604 T5 | 5/2020 | |
| DE | 402020100743 | 2/2021 | |
| DE | 112018003604 | 11/2023 | |
| EP | 2186552 A1 | 5/2010 | |
| ES | 59639 U | 6/1957 | |
| FR | 2595950 A1 | 9/1987 | |

(56) References Cited

FOREIGN PATENT DOCUMENTS

| GB | 2446885 | A | 8/2008 |
|----|---------|---|--------|
| GB | 2472046 | | 4/2013 |
| GB | 2496335 | | 5/2013 |
| GB | 6420068 | | 2/2025 |
| GB | 6420070 | | 2/2025 |
| JP | 1162349 | | 1/2003 |
| JP | 2003266362 | A | 9/2003 |
| JP | 1301180 | | 5/2007 |
| JP | D1638014 | | 7/2019 |
| JP | 6775862 | B1 | 10/2020 |
| JP | 1698172 | | 10/2021 |
| KR | 20180107353 | | 10/2018 |
| KR | 300994127 | | 2/2021 |
| KR | 3020240036125 | | 9/2024 |
| SU | 1734994 | | 5/1992 |
| WO | 2009030922 | | 3/2009 |
| WO | 2017103682 | A2 | 6/2017 |
| WO | 2019234706 | | 12/2019 |
| WO | 2020190594 | | 9/2020 |
| WO | 2020190594 | A1 | 9/2020 |
| WO | 2022207106 | | 10/2022 |
| WO | 2023107501 | | 6/2023 |
| WO | 2023110778 | | 6/2023 |
| WO | 2023246994 | | 12/2023 |
| WO | 2023246995 | | 12/2023 |
| WO | 2024058844 | | 3/2024 |
| WO | 2024072966 | | 4/2024 |
| WO | 2024085904 | | 4/2024 |
| WO | 2024111509 | A1 | 5/2024 |
| WO | 2024112350 | | 5/2024 |
| WO | 2024112351 | | 5/2024 |
| WO | 2024123766 | | 6/2024 |
| WO | 2024163992 | | 8/2024 |
| WO | D243074010 | | 10/2024 |
| WO | 2025019583 | | 1/2025 |
| WO | 2025042802 | | 2/2025 |
| WO | 2025072321 | | 4/2025 |
| WO | 2025103557 | A1 | 5/2025 |
| WO | 2025221916 | A1 | 10/2025 |

OTHER PUBLICATIONS

Park et al., Design of a lower limb exoskeleton including roll actuation to assist walking and standing up, 2015, IEEE, p. 359-354 (Year: 2015).*
Tsagarakis et al., Lower body realization of the baby humanoid—'iCub', 2007, IEEE, p. 3616-3622 (Year: 2007).*
Or, Humanoids Grow a Spine: The Effect of Lateral Spinal Motion on the Mechanical Energy Efficiency, 2012, IEEE, p. 1-11 (Year: 2012).*
Mike Oitzman, (date posted Aug. 6, 2024), Figure 02 humanoid robot is ready to get to work, therobotreport.com, URL: (https://www.therobotreport.com/figure-02-humanoid-robot-is-ready-to-get-to-work/), (Year: 2024).
Hebi Robotics, "T-Series Actuator," Jan. 29, 2024.
Cheng et al., "Human Posture Estimation Using Voxel Data for "Smart" Airbag Systems: Issues and Framework," IEEE, p. 84-89 (2004).
Droeschel et al., "Learning to Interpret Pointing Gestures with a Time-of-Flight Camera," IEEE, p. 481-488 (2011).
Frohlich et al., "Design and Impementation of a Spherical Joint for Mobile Manipulators," IEEE, p. 251-258 (2016).
Netzev et al., "Many Faced Robot—Design and Manufacturing of a parametric, Modular and Open Source Robot Head," IEEE, p. 342-348 (2019).
Netzev et al., Design and implementation of a spherical joint for mobile manipulators, 2019, IEEE, p. 342-348 (Year: 2019).
Haddadin et al., The "DLR crash report": Towards a standard crash-testing protocol for robot safety—Part II: Discussions, 2009, IEEE, p. 280-287 (Year: 2009).
Yaghoubi et al., Region-Based CNNs for Pedestrian Gender Recognition in Visual Surveillance Environments, 2019, IEEE, p. 1-5 (Year: 2019).

Pateromichelakis et al., Head-eyes system and gaze analysis of the humanoid robot Romeo, 2014, IEEE, p. 1374-131379 (Year: 2014).
Mokhtari et al., Taban:A Retro-Projected Social Robotic—Head for Human-Robot Interaction, 2019, IEEE, p. 46-51 (Year: 2019).
Merged original document with English translation (CN 112959343); Paragraphs added for citation purposes. (Year: 2021).
Merged original document (KR 20180107353) with English Translation (Year: 2018).
Available online at https://x.com/Tesla_Optimus/status/1844789517833629717, at least as early as Oct. 11, 2024.
Available online at https://x.com/elonmusk/status/1752516361799258318, at least as early as Jan. 30, 2024.
Duran-Hernandez et al., "Control Implementation in a Low-cost Designed Biped Robot to Reproduce Squats," The 10th International Conference on Control, Mechatronics and Automation, Nov. 9, 2022.
Hao et al., Design and kinematics analysis of a 4-DOF articulated steering mechanism, 2015, IEEE, p. 5875-5880 (Year: 2015).
Or, Computer Simulations of a Humanoid Robot Capable of Walking Like Fashion Models, 2012, IEEE, p. 241-248 (Year: 2012).
Available online at https://www.youtube.com/watch?v=Fb_R6IDDU4A, at least as early as Oct. 9, 2020.
Available online at https://www.youtube.com/watch?v=_mQJw8VhZ7w, at least as early as Oct. 5, 2022.
Available online at https://www.youtube.com/watch?v=a-R4H8-8074, at least as early as Jun. 6, 2015.
Available online at https://www.youtube.com/watch?v=1fC7b2LjVW4, at least as early as Jul. 12, 2016.
Ophaswongse et al., Optimal Design of a Novel 3-DOF Orientational Parallel Mechanism for Pelvic Assistance on a Wheelchair: An Approach Based on Kinematic Geometry and Screw Theory, 2020, IEEE, p. 3315-3322 (Year: 2020).
Shafti et al., Real-time Robot-assisted Ergonomics, 2019, IEEE, p. 1975-1981 (Year: 2019).
Luo et al., Human body trajectory generation using point cloud data for robotics massage applications, 2014, IEEE, p. 5612-5617 (Year: 2014).
Cheng et al., Human posture estimation using voxel data for "smart" airbag systems: issues and framework, 2004, IEEE, p. 84-89 (Year: 2004).
Souissi et al., Influence of the number of humanoid vertebral column pitch joints in flexion movements, 2011, IEEE, p. 227-282 (Year: 2011).
Available online at https://www.youtube.com/watch?v=q8ldbodRG14, at least as early as May 22, 2019.
Available online at https://youtu.be/GtPs_ygfaEA?si=7lv6MEFvFoaacKfa, at least as early as Aug. 15, 2023.
Available online at https://www.youtube.com/watch?v=FuNFr7V7KFQ, at least as early as Aug. 19, 2024.
Available online at https://www.youtube.com/watch?v=GzX1qOIO1bE, at least as early as May 13, 2024.
Available online at https://youtu.be/_MBd_XfXy9M?si=PbEHUJpRUFqaxS3J, at least as early as Jun. 26, 2023.
Available online at https://youtu.be/SHPxcRBIXNO?si=VbJqbK7jzUqtZGmn, at least as early as Sep. 26, 2023.
Available online at https://youtu.be/BvFxD-8AhJA?si=Vx1F4a76tbQDUX48, at least as early as Nov. 16, 2023.
Available online at https://www.youtube.com/watch?v=jWTWWuzB6Cg, at least as early as Aug. 27, 2024.
Available online at https://www.youtube.com/watch?v=B-ebMigAHzQ, at least as early as Sep. 30, 2024.
Available online at https://youtu.be/XiQkeWOFwmk?si=1qOPC8gXgmmGvXRT, at least as early as May 16, 2023.
Available online at https://youtu.be/cpraXaw7dyc?si=JvPaT6eMA18psrmU, at least as early as Dec. 13, 2023.
Available online at https://youtu.be/BNSZ8Fwcd20?si=_YnVgjYblVuhASk1, at least as early as Oct. 27, 2023.
Available online at https://youtu.be/SS3Ga2HQQ0s?si=Dwr3sJuCsOeUoSLj, at least as early as Nov. 20, 2023.
Available online at https://youtu.be/sihlDeJ4Hmk?si=fJsKpvRFPzFejmS6, at least as early as Dec. 27, 2023.
Available online at https://www.youtube.com/watch?v=zkBnFPBV3f0, at least as early as Jul. 11, 2013.

(56) References Cited

OTHER PUBLICATIONS

Available online at https://www.youtube.com/watch?v=oXBYZxa25vc &t=1s, at least as early as Apr. 3, 2013.
Available online at https://www.youtube.com/watch?v=LBem19AmTT4, at least as early as Apr. 7, 2015.
Available online at https://www.youtube.com/watch?v=IE-YBaYjbqY, at least as early as Dec. 10, 2013.
Available online at https://www.youtube.com/watch?v=y-j4dixQQml &t=222s, at least as early as May 22, 2012.
Available online at https://www.youtube.com/watch?v=Bmglbk_ Op64&t=1s, at least as early as Nov. 10, 2011.
Available online at https://www.youtube.com/watch?v=20GHG-R9eFI, at least as early as Mar. 6, 2023.
Available online at https://www.youtube.com/watch?v=bUrLuUxv9gE, at least as early as Aug. 30, 2024.
Available online at https://www.youtube.com/watch?v=-9EM5_ VFIt8, at least as early as Apr. 16, 2024.
Available online at https://www.youtube.com/watch?v=29ECwExc-_ M&t=2s, at least as early as Apr. 17, 2024.
Available online at https://www.youtube.com/watch?v=67CUudkjEG4, at least as early as Oct. 26, 2009.
Available online at https://www.youtube.com/watch?v=yBmatGQ0giY &t=1s, at least as early as Aug. 11, 2022.
Available online at https://www.youtube.com/watch?v=bdVrWxjK2vo, at least as early as Sep. 17, 2024.
Available online at https://www.youtube.com/watch?v=B_ l2k7MZEKg, at least as early as Jun. 30, 2024.
Available online at https://www.youtube.com/watch?v=CbA9wA9etGA, at least as early as Sep. 19, 2024.
Available online at https://www.youtube.com/watch?v=zLhA-RWBBYU, at least as early as Jul. 5, 2024.
Available online at https://www.youtube.com/watch?v=_mQJw8VhZ7w &t=111s, as least as early as Oct. 5, 2022.
Available online at https://www.youtube.com/watch?v=UPOLcE1vwA0, at least as early as Apr. 28, 2016.
Available online at https://www.youtube.com/watch?v=MCbGeC-kuBM, at least as early as Aug. 5, 2024.
Available online at https://www.youtube.com/watch?v=ujdK3yd2gHY, at least as early as Jul. 2, 2024.
Available online at https://www.youtube.com/watch?v=-HizP4UQvug, at least as early as Apr. 25, 2024.
Available online at https://www.youtube.com/watch?v=ioOkbUQqmZ0, at least as early as Nov. 9, 2022.
Available online at https://www.youtube.com/watch?v=q8ldbodRG14, at least as early as Feb. 26, 2024.
Available online at https://www.youtube.com/watch?v=CUhuhleQNos, at least as early as May 22, 2019.
Available online at https://www.youtube.com/watch?v=dY57qnD_ O7U, at least as early as Jul. 27, 2021.

Pateromichelakis et al., Head-eyes system and gaze analysis of the humanoid robot Romeo, 2014, IEEE, p. 1374-1379 (Year: 2014).
Jeung et al., Realization of human neck motion with novel robotic mechanism, 2016, IEEE, p. 482-486 (Year: 2016).
Barker et al., Natural head movement for HRI with a muscular-skeletal head and neck robot, 2017, IEEE, p. 587-592 (Year: 2017).
Gao et al., Development of a low motion-noise humanoid neck: Statics analysis and experimental validation, 2010, IEEE, p. 1203-1208 (Year: 2010).
Keselman et al., "Intel RealSense stereoscopic depth cameras," in Proceedings of the IEEE Conference on Computer Vision and Pattern Recognition Workshops, pp. 1-10, 2017.
Park et al., Mechanical Design of Humanoid Robot Platform KHR-3 (Kaist Humanoid Robot 3: Hubo), 2005, IEEE, pgl., 321-3226 (2005).
Nakada et al., Deep Learning of Neuromuscular and Visuomotor Control of a Biomimetic Simulated Humanoid, 2020, IEEE, p. 3952-3959 (Year: 2020).
Lim et al., Basic emotional walking using a biped humanoid robot, 1999, IEEE, p. 954-959 (Year: 1999).
Albers et al., Upper Body of a new Humanoid Robot—the Design of Armar III, 2006, IEEE, p. 308-309 (Year: 2006).
Englsberger et al., "Overview of the Torque-Controlled Humanoid Robot TORO," 2014 14th IEEE-RAS International Conference on Humanoid Robots (Humanoids), Nov. 18-20, 2014. Madrid, Spain.
Machine translation of CN-114147745-A (Year: 2022).
Machine translation of DE-112018003604-T5 (Year: 2020).
Machine translation of WO-2020190594-A1. (Year: 2020).
"A lightweight robotic leg prosthesis replicating the biomechanics of the knee, ankle, and toe joint", published Nov. 23, 2022 retrieved from Wayback machine URLhttps://www.science.org/doi/10.1126/scirobotics.abo3996 on Feb. 22, 2026 (Year: 2022).
https://web.archive.org/web/20220702203427/https://singularityhub.com/2010/01/20/iwalk-presents-worlds-first-actively-powered-foot-and-ankle/ (Year: 2010).
https://www.hola.com/us/celebrities/20221003337667/elon-musk-unveils-robot/ Oct. 3, 2022 (Year: 2022).
https://robotsguide.com/robots/figure (Year: 2023).
https://startup-weekly.com/Figure-announces-70m-Seres-A-to-support-commercialization-of-Figure-01-humanoid-obot5/312/2023 ( Year: 2023).
https://www.cnn.com/2022/09/30/business/tesla-bot-robot Oct. 1, 2022 (Year: 2022).
https://electrek.co/2023/05/16/tesla-bot-sideshow-new-footage-robots/ May 16, 2023 (Year: 2023).
https://www.humanoidsdaily.com/news/figure-reveals-fgure-03-in-new-teaser-full-unveling-set-for-october-10 (Oct. 7, 2025) (Year: 2025).
htp://www.analyticsinsight.net/artificial-inteligence/xiaomis-cyberone-a-new-humanoid-obot-to-fight-teslabot(Sep. 8, 2022) (Year: 2022).

* cited by examiner

400

600

402b

402a

404b

404ba

406b

406a

408b

408a

410b

442a

440a

410a

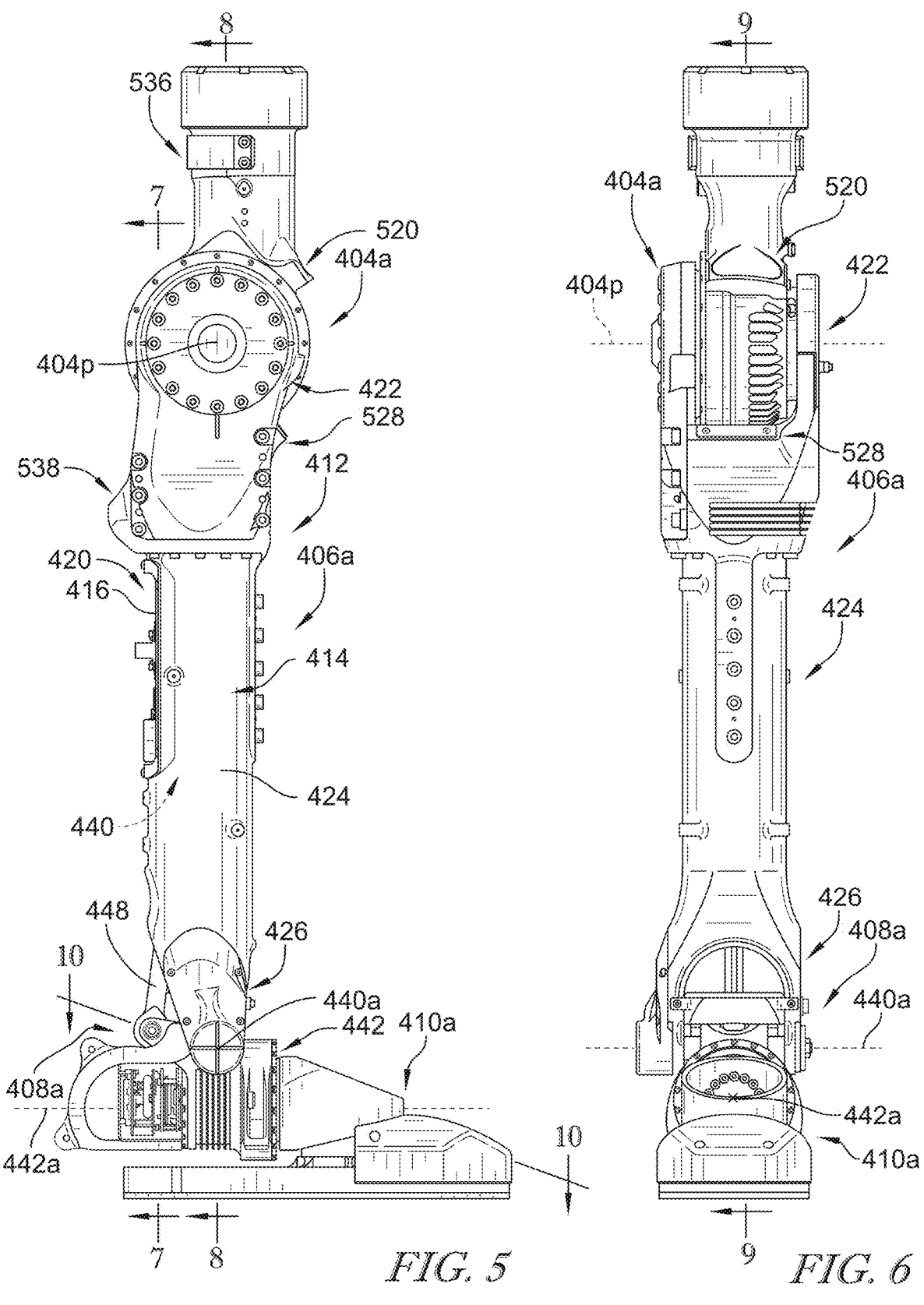
*FIG. 5*                  *FIG. 6*

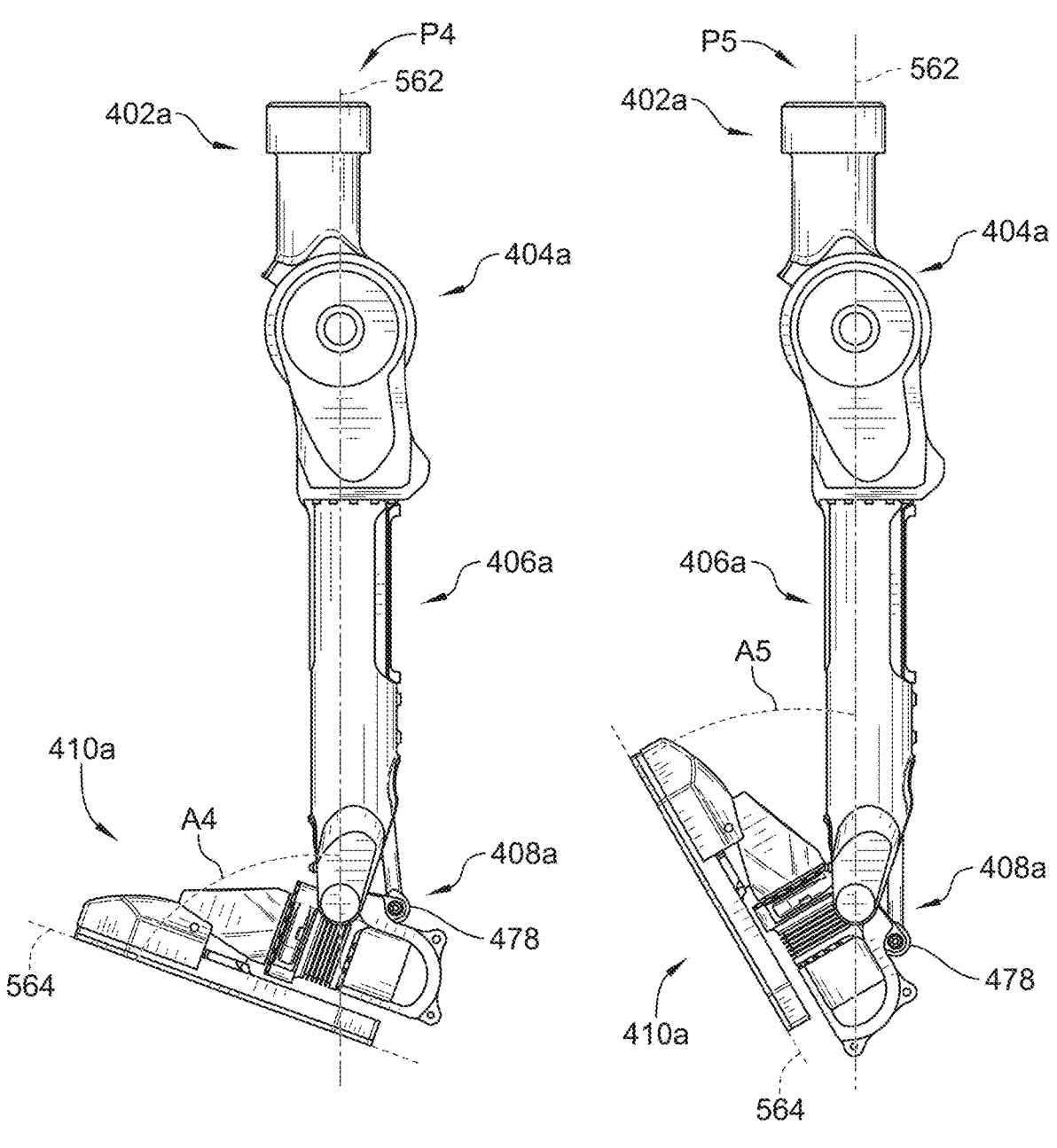
*FIG. 24*          *FIG. 25*

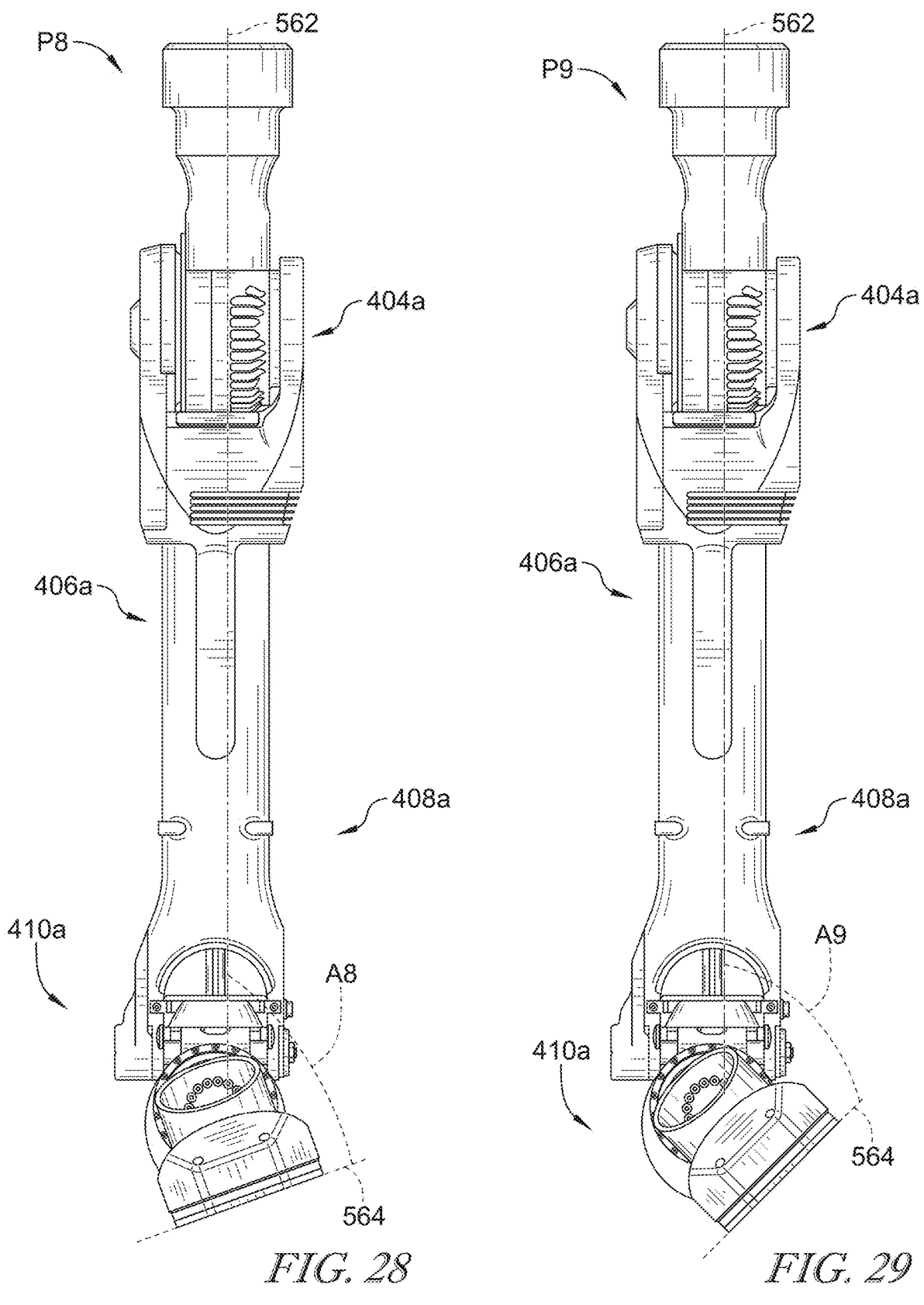
*FIG. 28*                *FIG. 29*

HUMANOID ROBOT WITH AN ANKLE REGION

PRIORITY CLAIM AND CROSS-REFERENCE TO RELATED APPLICATIONS

This application is a continuation-in-part of U.S. patent application Ser. No. 18/904,332, filed Oct. 2, 2024 and claims priority under 35 U.S.C. § 119 (e) to U.S. Provisional Patent Application No. 63/626,039, filed Feb. 21, 2024, U.S. Provisional Patent Application No. 63/626,035, filed Feb. 27, 2024, U.S. Provisional Patent Application No. 63/564, 741, filed Mar. 13, 2024, U.S. Provisional Patent Application No. 63/626,034, filed Mar. 13, 2024, U.S. Provisional Patent Application No. 63/626,037, filed May 28, 2024, and U.S. Provisional Patent Application No. 63/706,768, filed Oct. 14, 2024, each of which is expressly incorporated by reference herein in its entirety.

Reference is hereby made to U.S. Design patent application Ser. No. 29/889,764, filed Apr. 17, 2023, U.S. Provisional Patent Application No. 63/626,030, filed Feb. 21, 2024, U.S. Provisional Patent Application No. 63/626,028, filed Feb. 27, 2024, U.S. Provisional Patent Application No. 63/557,874, filed Feb. 26, 2024, U.S. Provisional Patent Application No. 63/626,040, filed Jan. 28, 2024, U.S. Provisional Patent Application No. 63/626,105, filed Jan. 29, 2024, U.S. Provisional Patent Application No. 63/625,362, filed Jan. 26, 2024, U.S. Provisional Patent Application No. 63/625,370, filed Jan. 26, 2024, U.S. Provisional Patent Application No. 63/625,381, filed Jan. 26, 2024, U.S. Provisional Patent Application No. 63/625,384, filed Jan. 26, 2024, U.S. Provisional Patent Application No. 63/625,389, filed Jan. 26, 2024, U.S. Provisional Patent Application No. 63/625,405, filed Jan. 26, 2024, U.S. Provisional Patent Application No. 63/625,423, filed Jan. 26, 2024, U.S. Provisional Patent Application No. 63/625,431, filed Jan. 26, 2024, U.S. Provisional Patent Application No. 63/685,856, filed Aug. 22, 2024, U.S. Provisional Patent Application No. 63/696,507, filed Sep. 19, 2024, and U.S. Provisional Patent Application No. 63/696,533, filed Sep. 19, 2024, each of which is expressly incorporated by reference herein in its entirety.

TECHNICAL FIELD

This disclosure relates to a portion of a foot of a robot, specifically a foot of a general-purpose humanoid robot. The foot of a robot includes a plurality of components configured to provide the robot with the ability to substantially mimic the movements, functionality, and capabilities of a human being.

BACKGROUND

The current workplace landscape is marked by an unparalleled labor shortage, evident in over 10 million unsafe or undesirable jobs within the United States. To counter this ever-expanding labor shortage, it has become imperative to design and integrate advanced robots capable of handling unappealing and even hazardous workplace tasks. With the goal of performing these tasks in an optimal and efficient manner, advanced robots are typically general-purpose humanoid robots tailored for human-centric environments.

These general-purpose humanoid robots emulate human form and functionality with two legs, two arms, and a face-like screen. With the general-purpose humanoid robot's emulation of the human body, arises the necessity for various actuators arranged within the robot to closely replicate human movements and capabilities. There is a need for a foot that is capable enabling the robot to walk in order to allow said robot to seamlessly interact with and physically manipulate diverse objects in complex environments, while performing in a durable, cost-effective, and controllable manner using the robot's limited resources, including its battery power resources.

SUMMARY

A humanoid robot includes an upper region, a lower region, and a central region. The upper region includes a head, a torso, and a pair of arms coupled to the torso. The central region is coupled between to the upper region and the lower region. The lower region includes a pair of legs depending from the central region. In illustrative embodiments, each leg includes (i) a thigh coupled to the central region, (ii) a knee coupled to a lower end of the thigh, (iii) a shin coupled to a lower end of the knee, (iv) an ankle assembly coupled to the shin, and (v) a foot coupled to the ankle assembly. The ankle assembly is configured to control pivotal movement of the foot relative to the rest of the robot about a first pivotal axis to adjust a pitch of the foot and a second pivotal axis to adjust a roll of the foot.

In illustrative embodiments, the ankle assembly includes: (i) a foot-flexion actuator assembly coupled to the shin and configured to control pitch movement of the foot relative to the shin about the first pivotal axis, and (ii) a foot-roll actuator assembly coupled to the shin and configured to control roll movement of the foot relative to the shin about the second pivotal axis. The first pivotal axis and the second pivotal axis remain orthogonal to one another as the foot pivots about the first pivotal axis and the second pivotal axis. The foot-roll actuator assembly is also coupled to the foot-flexion actuator assembly, and the foot-roll actuator assembly is configured to control roll movement of the foot relative to both the shin and the foot-flexion actuator assembly about the second pivotal axis. The second pivotal axis moves about the first pivotal axis as the foot-flexion actuator assembly moves the foot about the first pivotal axis. When the humanoid robot is in the upright standing position: (i) the first pivotal axis resides in a first substantially horizontal plane and the second pivotal axis resides in a second substantially horizontal plane, and (ii) the first plane is located vertically above both the second pivotal axis and the second plane.

In illustrative embodiments, the robot's feet are indirectly coupled to each respective shin via the intermediate ankle assemblies, and specifically the foot-roll actuator assembly that controls roll movement of each respective foot relative to the shins. The indirect coupling of the feet to the shins allows the feet to move independently of the shins in the roll direction. Locating the foot-roll actuator assemblies between each respective foot and shin provides greater stability for the robot when it is stationary in a normal, upright standing position and creates space or volume in the shins, for other components such as computer hardware, wiring, battery storage, and/or for a more robust foot-flexion actuator assembly which controls pitch or flexion of the robot's feet.

In some embodiments, the humanoid robot includes a third pivotal axis which is: (i) arranged orthogonal to the first pivotal axis and (ii) oriented at an angle to the second pivotal axis within a range of about 80 degrees to about 100 degrees when the humanoid robot is in the upright standing position. In some specific embodiments, the third pivotal axis is arranged orthogonal to the first pivotal axis when the humanoid robot is in the upright standing position.

In other embodiments, when the foot is in a dorsiflexion position (toes pointing upward) relative to the shin, the connector rod is oriented at a second angle to the second pivotal axis, wherein the second angle is less than the first angle. In further embodiments, when the foot is in a plantar flexion position (toes pointing downward) relative to the shin, the connector rod is oriented at a third angle to the second pivotal axis greater than the first and second angles. In additional embodiments, the humanoid robot includes a foot housing including (i) a toe portion at a front end of the foot housing, (ii) a heel portion at a rear end of the foot housing, and a (iii) center portion located between the toe portion and the heel portion, and wherein the foot-roll actuator assembly is located vertically above the heel portion to provide a gap vertically there between when the humanoid robot is in the upright standing position.

In some embodiments, the connector rod is oriented at a first angle to the third pivotal axis within a range of about 10 degrees to about 30 degrees when the humanoid robot is in the upright standing position. In other embodiments, when the foot is in a dorsiflexion position relative to the shin, the connector rod is oriented at a second angle to the third pivotal axis, wherein the second angle is greater than the first angle. In further embodiments, when the foot is in a plantar flexion position relative to the shin, the connector rod is oriented at a third angle to the third pivotal axis less than the first and second angles. In additional embodiments, the connector rod has a distal end located a distance from the first pivotal axis in a rearward direction.

BRIEF DESCRIPTION OF THE DRAWINGS

The drawing figures depict one or more implementations in accord with the present teachings, by way of example only, not by way of limitation. In the figures, like reference numerals refer to the same or similar elements shown across various other figures.

FIG. 5 is a side view of one of the legs of the lower region of FIG. 3;

FIG. 6 is a front view of one of the legs of the lower region of FIG. 3;

FIG. 19 is a cross-sectional view of the actuator housing taken along line 19-19 in

FIG. 18;

FIG. 20 is a front view of the actuator housing of FIG. 17;

FIG. 24 is a side view of the leg of FIG. 22 showing the foot in a partially flexed, dorsiflexion position P4 showing an angle A4 between the first plane and the second plane;

FIG. 25 is a side view of the leg of FIG. 22 showing the foot in a maximum flexed, dorsiflexion position P5 showing an angle A5 between the first plane and the second plane;

FIG. 28 is a front view of the leg of FIG. 22 showing the foot rolled to a second side in a partially flexed position P8 showing an angle A8 between the first plane and the second plane;

FIG. 29 is a front view of the leg of FIG. 22 showing the foot rolled to the second side in a maximally flexed position P9 showing an angle A9 between the first plane and the second plane.

DETAILED DESCRIPTION

Figure 1:
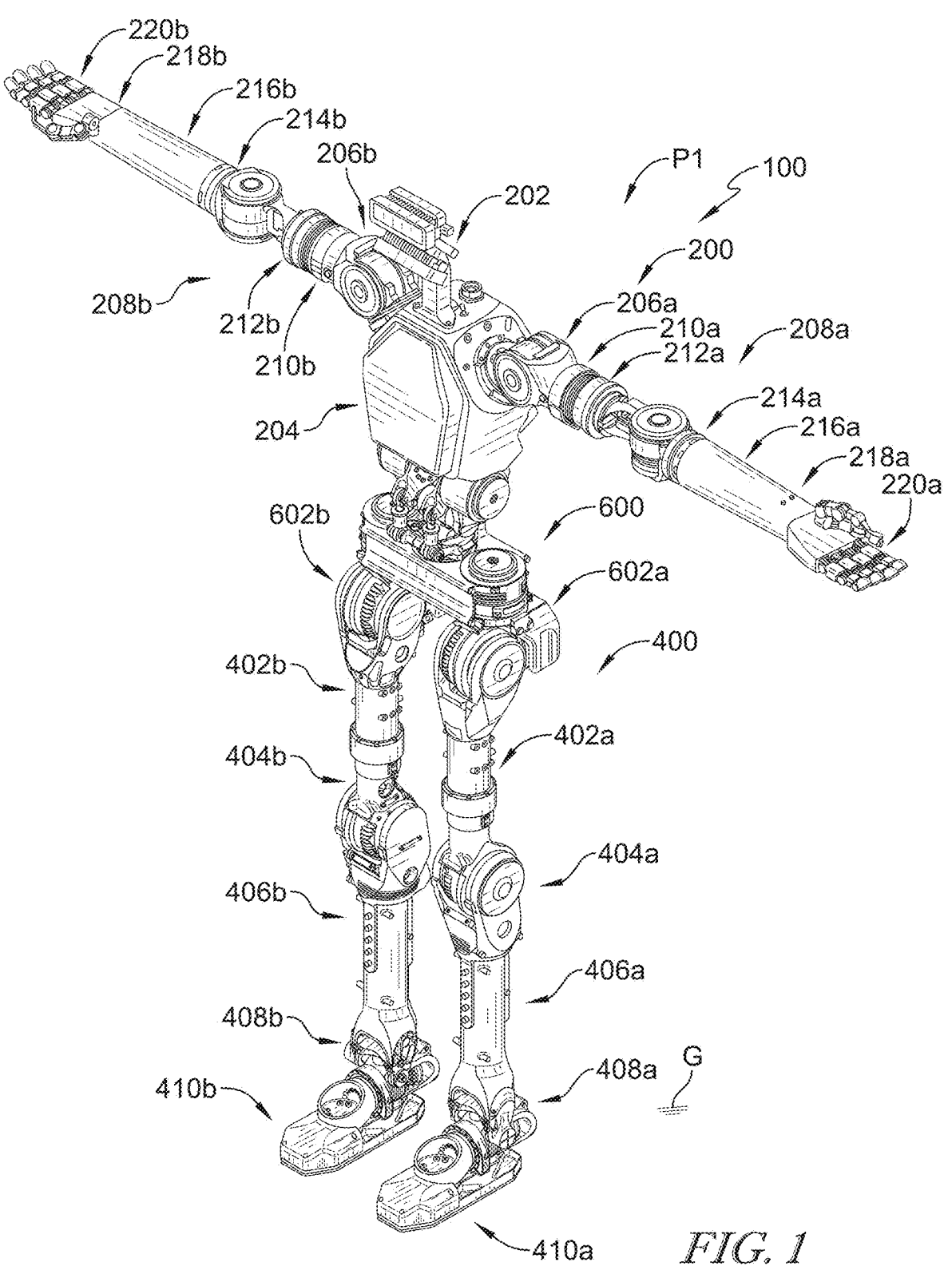
FIG. 1 is a perspective view of a humanoid robot in an upright, standing position P1 and including: (i) an upper region having the following parts: (a) a head and neck assembly, (b) a torso, (c) left and right shoulders, (d) left and right upper arm assemblies that each include an upper humerus, lower humerus, upper forearms, and lower fore-arms, (e) left and right wrists, and (f) left and right hands, (ii) a lower region having the following parts: (a) left and right upper thighs, (b) left and right lower thighs, (c) left and right shins, (d) left and right ankle assemblies, and (e) left and right feet, and (iii) a central region connecting the upper portion and the lower portion to one another and configured to allow movement of the upper and lower regions relative to one another.

In the following detailed description, numerous specific details are set forth by way of examples in order to provide a thorough understanding of the relevant teachings. However, it should be apparent to those skilled in the art that the present teachings may be practiced without such details. In other instances, well-known methods, procedures, components, and/or circuitry have been described at a relatively high-level, without detail, in order to avoid unnecessarily obscuring aspects of the present disclosure.

While this disclosure includes several embodiments in many different forms, there is shown in the drawings and will herein be described in detail embodiments with the understanding that the present disclosure is to be considered as an exemplification of the principles of the disclosed methods and systems, and is not intended to limit the broad aspects of the disclosed concepts to the embodiments illustrated. As will be realized, the disclosed methods and systems are capable of other and different configurations and several details are capable of being modified all without departing from the scope of the disclosed methods and systems. For example, one or more of the following embodiments, in part or whole, may be combined consistent with the disclosed methods and systems. As such, one or more steps from the flow charts or components in the Figures may be selectively omitted and/or combined consistent with the disclosed methods and systems. Additionally, one or more steps from the flow charts or the method of assembling the shoulder and upper arm may be performed in a different order. Accordingly, the drawings, flow charts and detailed description are to be regarded as illustrative in nature, not restrictive or limiting.

A. Introduction

Unlike conventional robots, the disclosed humanoid robot 100 includes a lower region 400 with left and right ankle assemblies 408a, 408b that improve the stability, mobility and functionality of the robot 100. Each ankle assembly 408a, 408b is coupled to a respective left and right shins 406a, 406b of the lower region 400, while each left and right foot 410a, 410b of the robot 100 is coupled to the respective ankle assembly 408a, 408b. In other words, the robot's feet 410a, 410b are indirectly coupled to each respective shin 406a, 406b via the intermediate ankle assemblies 408a, 408b, and specifically a foot-roll actuator assembly 442 that controls a "roll" movement (side-to-side tilting, described below) of each respective foot 410a, 410b relative to the shins 406a, 406b. The indirect coupling of the feet 410a, 410b to the shins 406a, 406b allows the feet 410a, 410b to move independently of the shins 406a, 406b in the roll direction. This architecture is beneficial over conventional robots that directly couple their foot to their shin because said conventional robots cannot control the amount of "roll" of each foot and/or must include an additional actuator in the robot's shin for this roll movement. Locating the foot-roll actuator assemblies 442 between each respective foot 410a, 410b and shin 406a, 406b provides greater stability for the robot 100 when it is stationary in a normal, upright standing position P1 and creates space or volume in the shins 406a, 406b for other components such as computer processing units, power distribution boards, control Printed Circuit Boards (PCBs), wiring, battery storage, and/or for a more robust foot-flexion actuator assembly 440 which controls pitch or flexion (forward/backward tilting) of the robot's feet 410a, 410b.

In the innovative robot 100, the housing 412 of the robot's shin 406a is coupled to the foot-roll actuator assembly 442 at a first location, and the foot-flexion actuator assembly 440 is coupled to the foot-roll actuator assembly 442 at a second location. The second location is: (i) positioned rearward of the first location, and/or (ii) is vertically above (or elevated) relative to said first location when the robot is in the upright standing position P1. Specifically, a plane 439 (FIG. 14) that intersects the central point of the first and second locations is oriented at an angle relative to a horizontal support (or ground) surface G that each foot 410a, 410b is resting upon, wherein said angle can be between 1 degree and 40 degrees, preferably between 10 degrees and 20 degrees. In other words, the first location is positioned forward of and vertically below the second location. This positional relationship and the fact that the first location is fixed relative to the shin 406a causes the foot 410a (along with the attached foot-roll actuator assembly 442) to pivot or be angularly displaced about the first location (axis 440a) in response to flexion or actuation of the foot-flexion actuator assembly 440.

As described in greater detail below, the foot-flexion actuator assembly 440 includes a linear actuator, driven by a rotary motor 446 via a ball screw 454 mechanism, designed to allow the robot 100 to change the pitch of the foot 410a of the robot 100. In particular, the foot-flexion actuator assembly 440 is designed to move the robot's foot 410a from an initial position P1 to a partially or maximum flexed plantar flexion position P2, P3, where the toe box of the foot 410a is pointed in a downward direction, and to a partially or maximum flexed dorsiflexion position, P4, P5, where the toe box of the foot 410a is pointed in an upward direction. The range of motion for foot pitch is about-40 degrees (plantar flexion) to about +60 degrees (dorsiflexion).

The foot-roll actuator assembly 442 includes a rotary actuator that is configured to allow the robot 100 to change the roll of the foot 410a of the robot 100. In particular, the foot-roll actuator assembly 442 is configured to move the robot's foot 410a from an initial position P1 to an inversion position P6, P7, where the arch of the foot 410a is rolled upward (medially), and to an eversion position P8, P9, where the arch of the foot 410a is rolled downward (laterally). The range of motion for foot roll is about-45 degrees (inversion) to about +45 degrees (eversion). This extensive range of motion in both pitch and roll enables the robot 100 to accurately move its feet 410*a*, 410*b* over uneven or discontinuous surfaces and provides greater balance and stability against side-to-side movements of the robot 100 when both feet 410*a*, 410*b* are planted on the ground G in the normal, upright standing position P1.

The arrangement of the actuators 440, 442 in the legs also provides for a more robust and intricate load distribution path through the leg so that the robot 100 can more accurately sense forces and positions of each component via one or more sensor arrangements, such as sensor assembly 544. The load path LP has a curvilinear configuration and can include a partial S-shaped segment when the leg is viewed from the side. In this way, loads travel through the shin 406*a* and into the actuator housing 482 of the foot-roll actuator assembly 442 in a substantially vertical direction due to the alignment of the knee pivot axis 404*p* directly above the first pivotal axis 440*a*. From there, the loads are transferred in a forward direction through an output (drive shaft 486) of the foot-roll actuator assembly 442 and into a coupling assembly 542 included in the foot 410*a*. The coupling assembly 542 is coupled to a 6-axis sensor 545 within sensor assembly 544, which is positioned between the coupling assembly 542 and a foot base structure 546 which engages with the ground G while the robot 100 walks. The foot-roll actuator assembly 442 is cantilevered to the coupling assembly 542 to provide a gap 514 vertically between the actuator housing 482 and a portion (heel portion) of the foot 410*a* when the robot 100 is in the upright standing position P1. Thus, the curvilinear load path LP is not linear and transfers the loads through a sensor 545 in the foot 410*a* to more accurately measure forces acting on the robot's legs.

Unlike conventional robots with foot assemblies controlled using two actuators positioned in the shin, both of the ankle assemblies 408*a*, 408*b* of the inventive robot 100 only include a single actuator (i.e., foot-flexion actuator 440) coupled primarily to the shin 406*a* and a single actuator (i.e., foot-roll actuator 442) coupled between the shin 406*a* and the foot 410*a* (specifically, housed within the ankle assembly 408*a* itself). The foot-roll actuator assembly 442 is dedicated to provide roll in that it cannot control the foot's flexion or pitch, and the foot-flexion actuator assembly 440 is dedicated to provide flexion (pitch) in that it cannot control the foot's roll. The two actuator arrangement of each ankle assembly 408*a*, 408*b*, with one actuator located lower in the ankle structure itself, is unconventional because it substantially increases the weight at the end of the leg compared to placing both actuators higher in the shin, thereby increasing the required torque necessary for operation of the knee 404*a*, 404*b* and hip actuators 602*a*, 602*b*, thereby increasing power requirements and consumption. However, the two actuator arrangement in each ankle assembly 408*a*, 408*b* is beneficial because it is more robust, allows for greater and more precise control over the foot's position (both pitch and roll), while improving the stability of the robot 100 in the upright standing position P1.

Unlike conventional robotic shins and feet, the shins 406*a*, 406*b*, ankles 408*a*, 408*b* and feet 410*a*, 410*b* of the inventive robot 100 are designed to position a hip, or leg twist actuator above both the shin 406*a*, 406*b* and the foot flexion (pitch) and roll actuators 440, 442. Additionally, the robot 100 lacks a separate foot yaw actuator or another actuator within the foot or ankle assembly that can rotate the foot 410*a*, 410*b* relative to the robot's leg about a vertical axis (yaw). Instead, the robot 100 relies on the disclosed hip actuator (60*a*, 602*b*) positioned above the linear foot-flexion actuator 440 to enable the robot 100 to move its foot 410*a*, 410*b* relative to the rest of its body in yaw rotation. Combining these functions (hip flexion/extension, abduction/adduction, and leg twist/yaw) within a single hip actuator assembly 602*a*, 602*b* provides substantial advantages over the prior art because it reduces the number of actuators contained in the robot 100; thereby reducing manufacturing cost and time, and thereby decreasing potential failure modes associated with including an additional actuator in the robot 100 leg structure for foot yaw.

Figure 3:
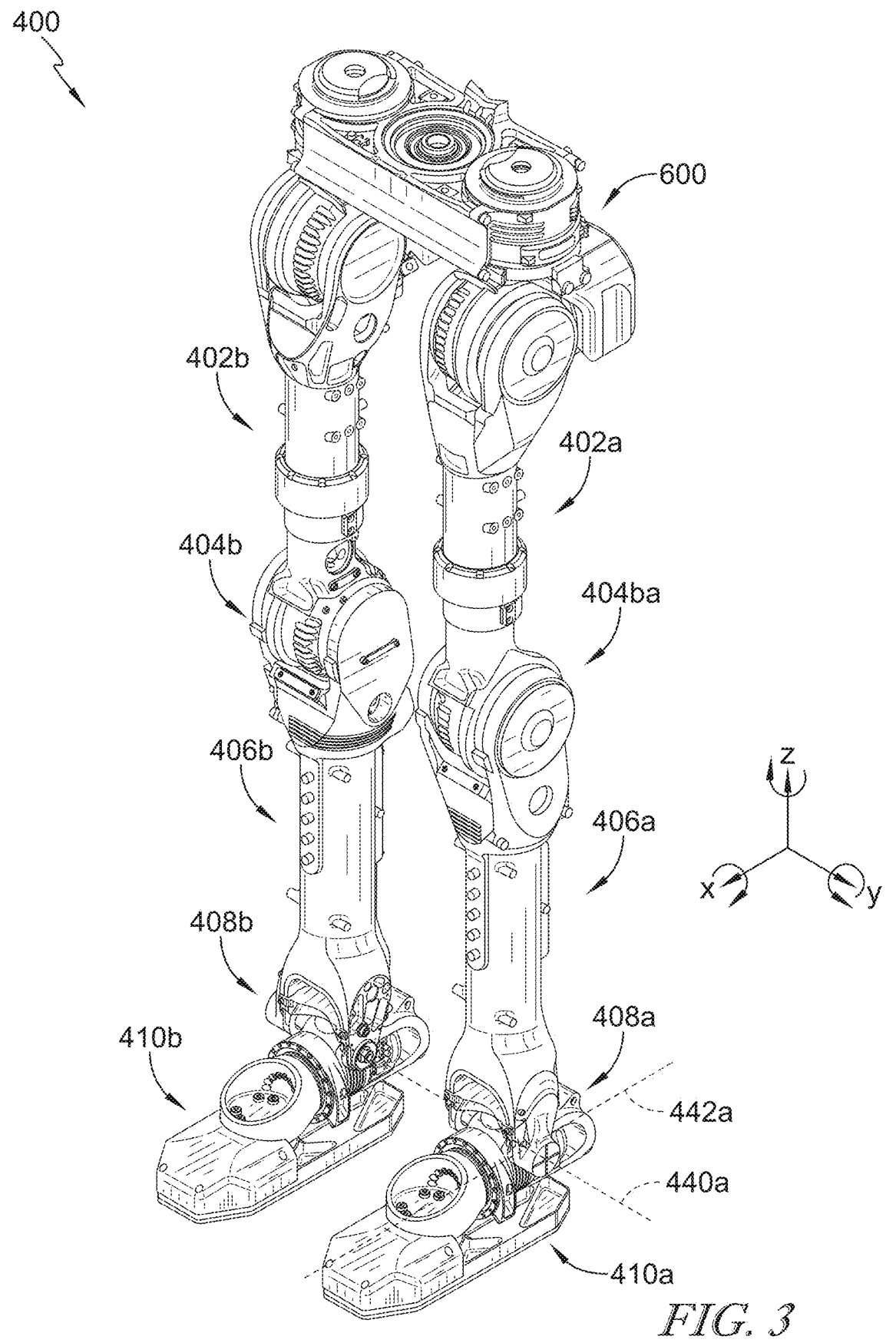
FIG. 3 is a perspective view of the central region and the lower region of the humanoid robot of FIG. 1 in the upright, standing position P1 and showing each ankle assembly including: (i) a foot-flexion actuator coupled to a respective shin and configured to pivot each respective foot relative to the shin about a first pivotal axis, and (ii) a foot-roll actuator coupled to each respective foot and configured to pivot each respective foot about a second pivotal axis orthogonal to the first pivotal axis.
Figure 4:
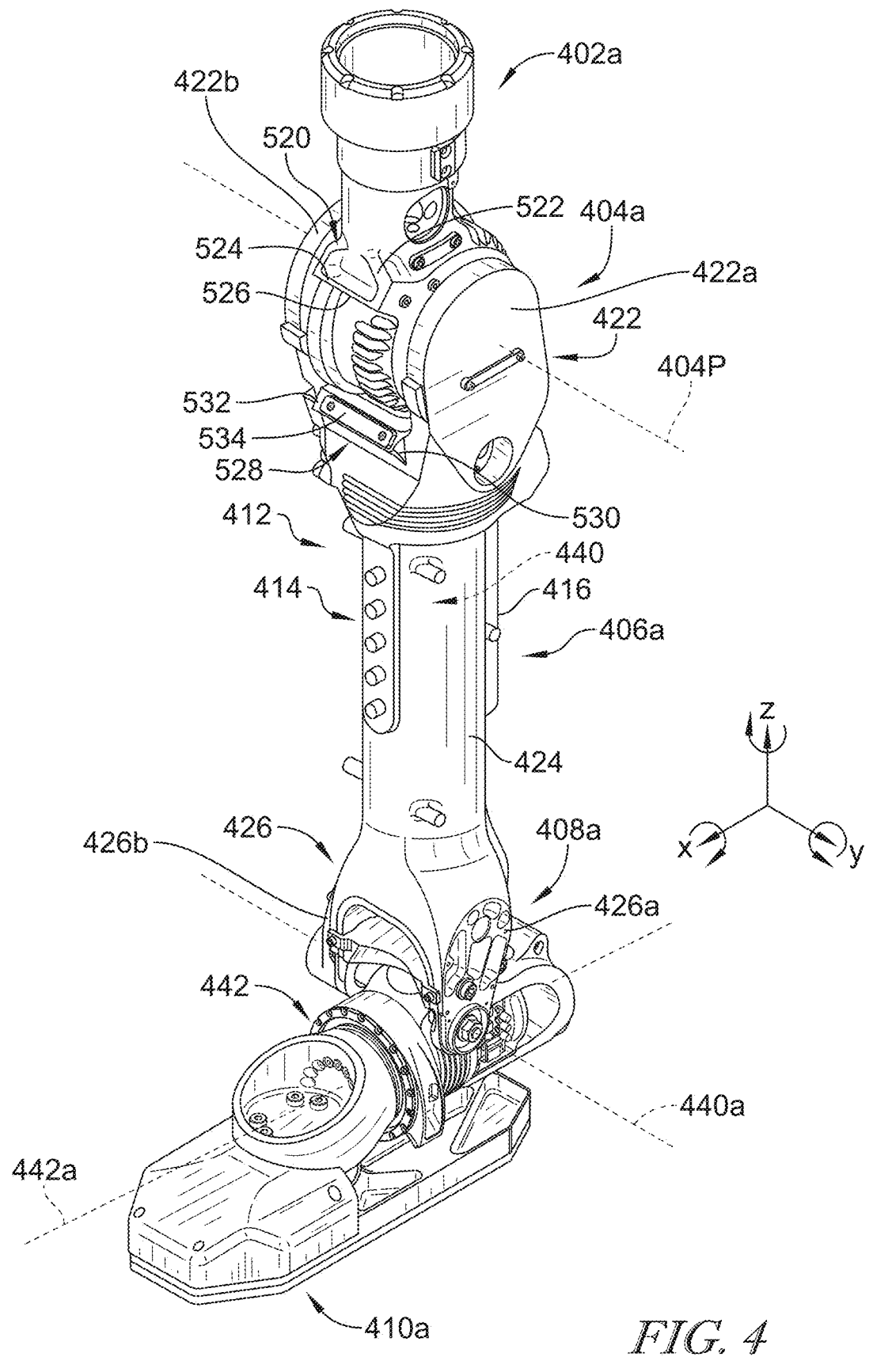
FIG. 4 is a second perspective view of a portion of one of the legs of the lower region of FIG. 3, showing the leg in the upright, standing position P1.
Figure 7:
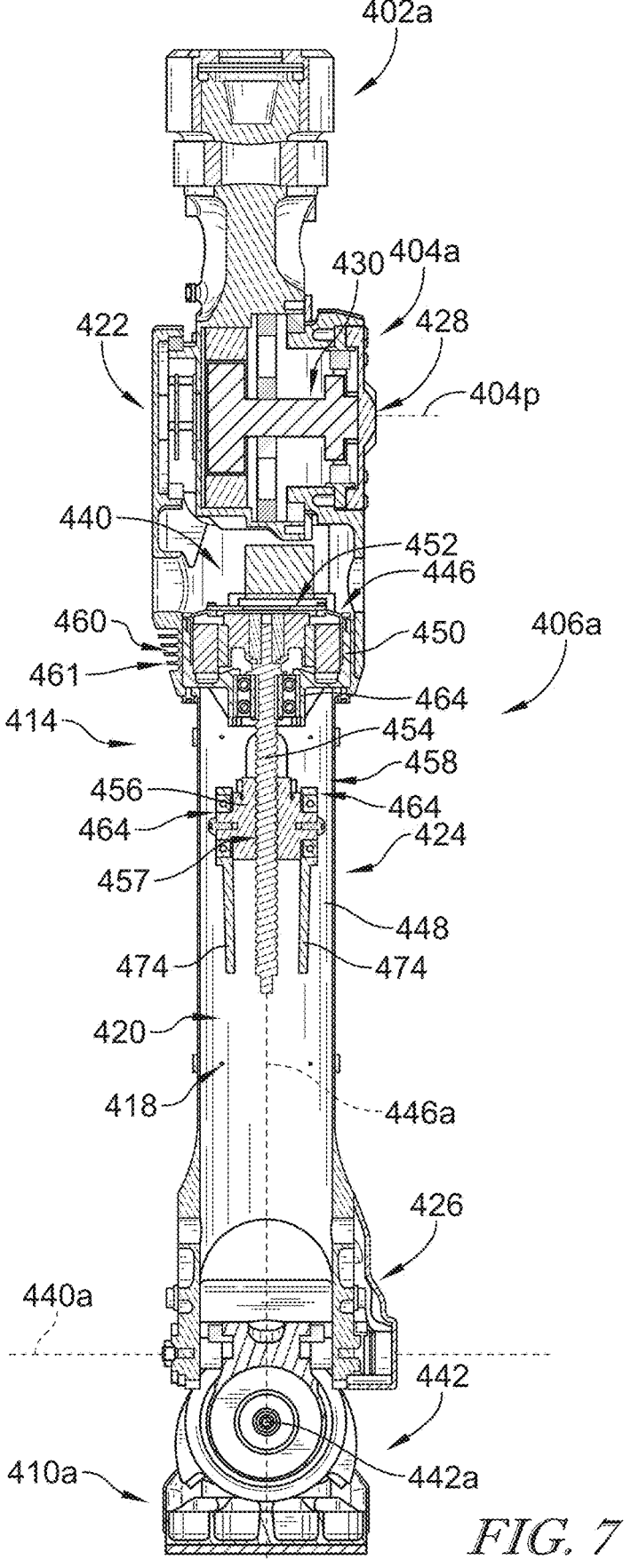
FIG. 7 is a first cross-sectional view of the leg taken along line 7-7 in FIG. 5 showing the foot-flexion actuator including: (i) a motor, (ii) a drive shaft coupled to the motor for rotation about a third axis established by the drive shaft and extending in a vertical direction through the knee and an interior of the shin, and (iii) a connector rod coupled to the drive shaft and movable along the third axis in response to rotation of the drive shaft by the motor to provide pivotal movement of the foot and the foot-roll actuator about the first pivotal axis.
Figure 9A:
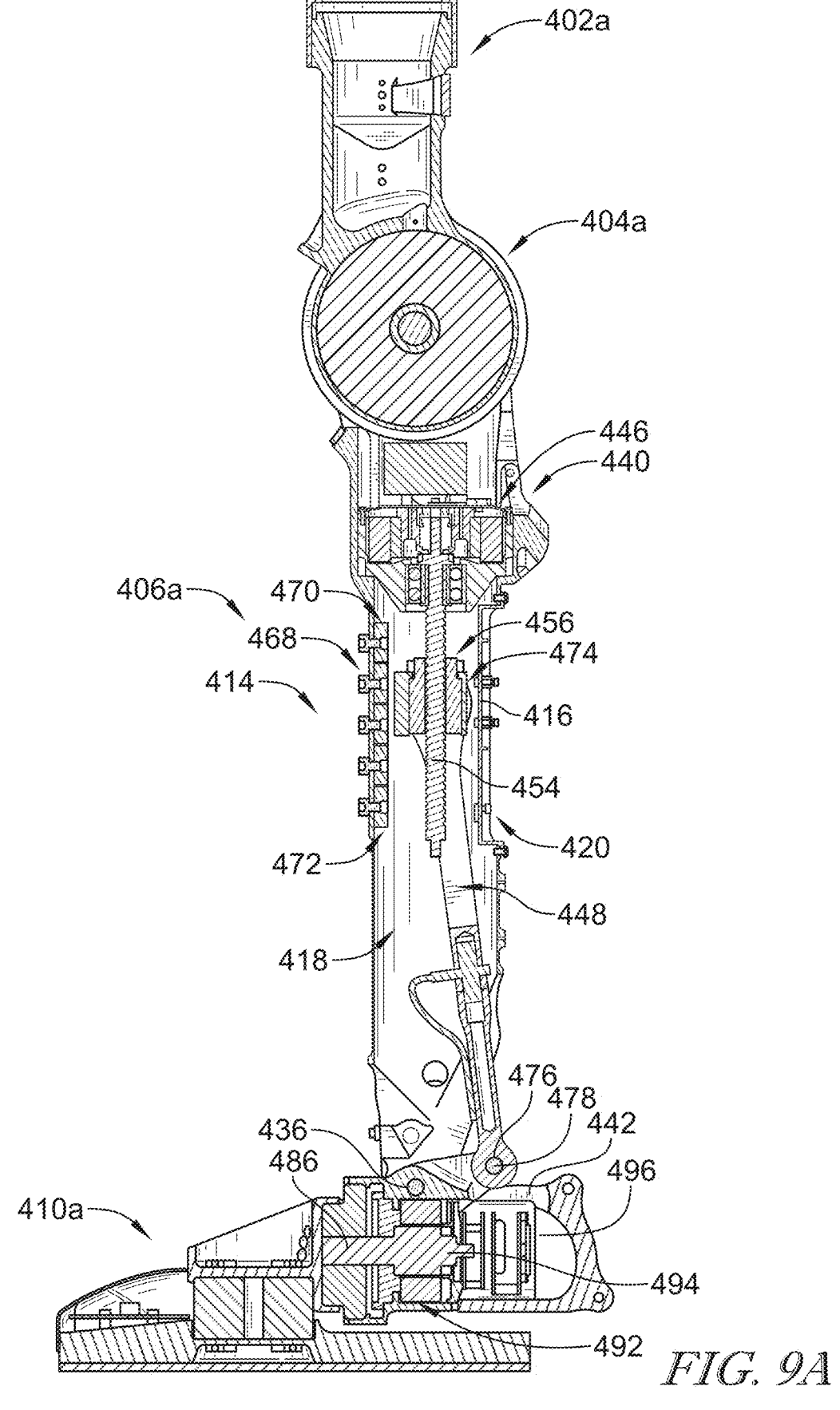
FIG. 9A is a third cross-sectional view of the leg taken along line 9-9 in FIG. 6 showing the foot-flexion actuator further including a slide coupled to and extending between the drive shaft and the connector rod to move in the vertical direction as the drive shaft rotates about the third axis and provide pivotable movement of the foot and the foot-roll actuator assembly about the first pivotal axis.
Figure 9B:
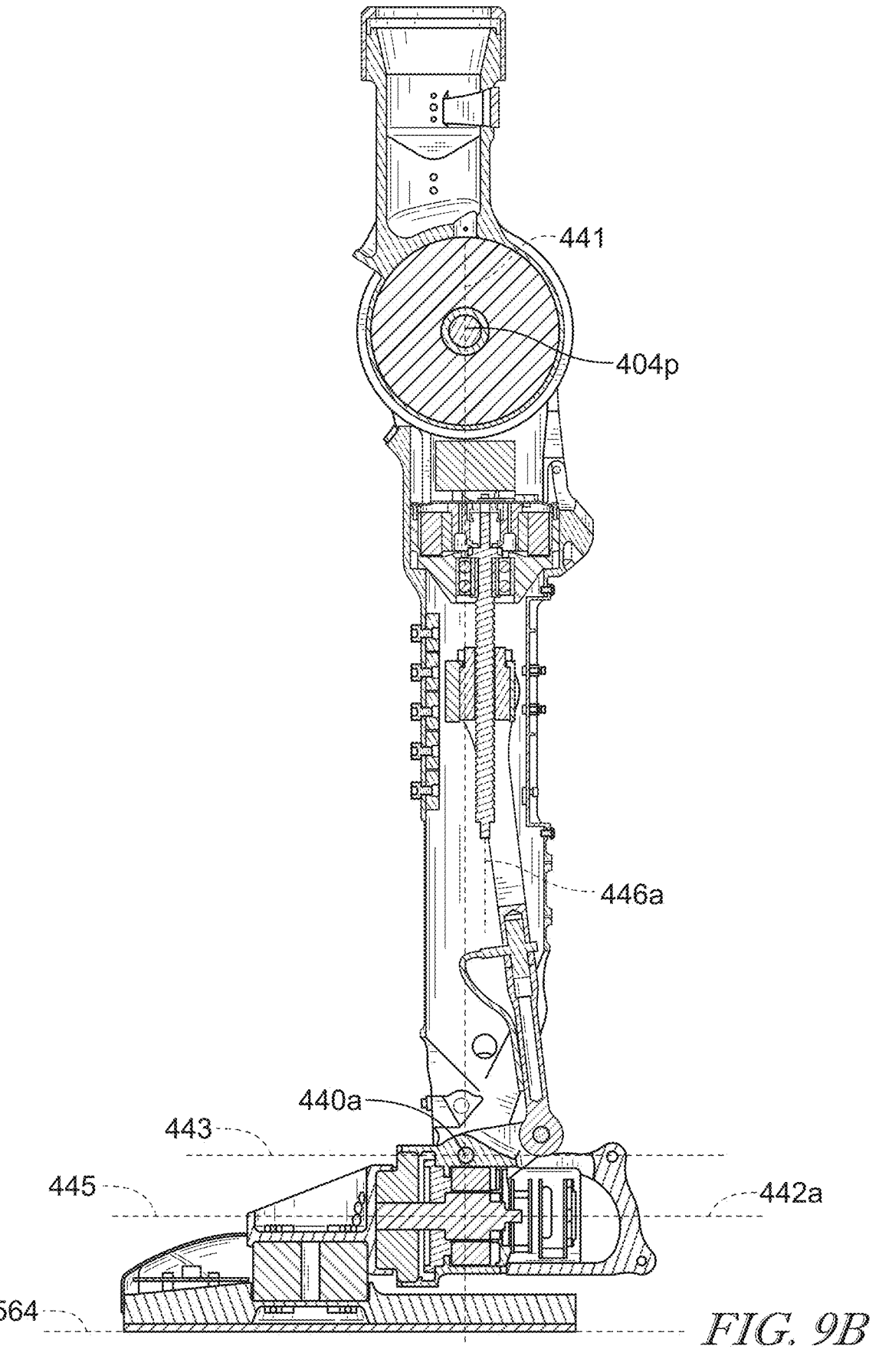
FIG. 9B is a cross-sectional view of the leg taken along line 9-9 in FIG. 6 that is similar to FIG. 9A and showing various planes and axes of the ankle assembly.
Figure 10:
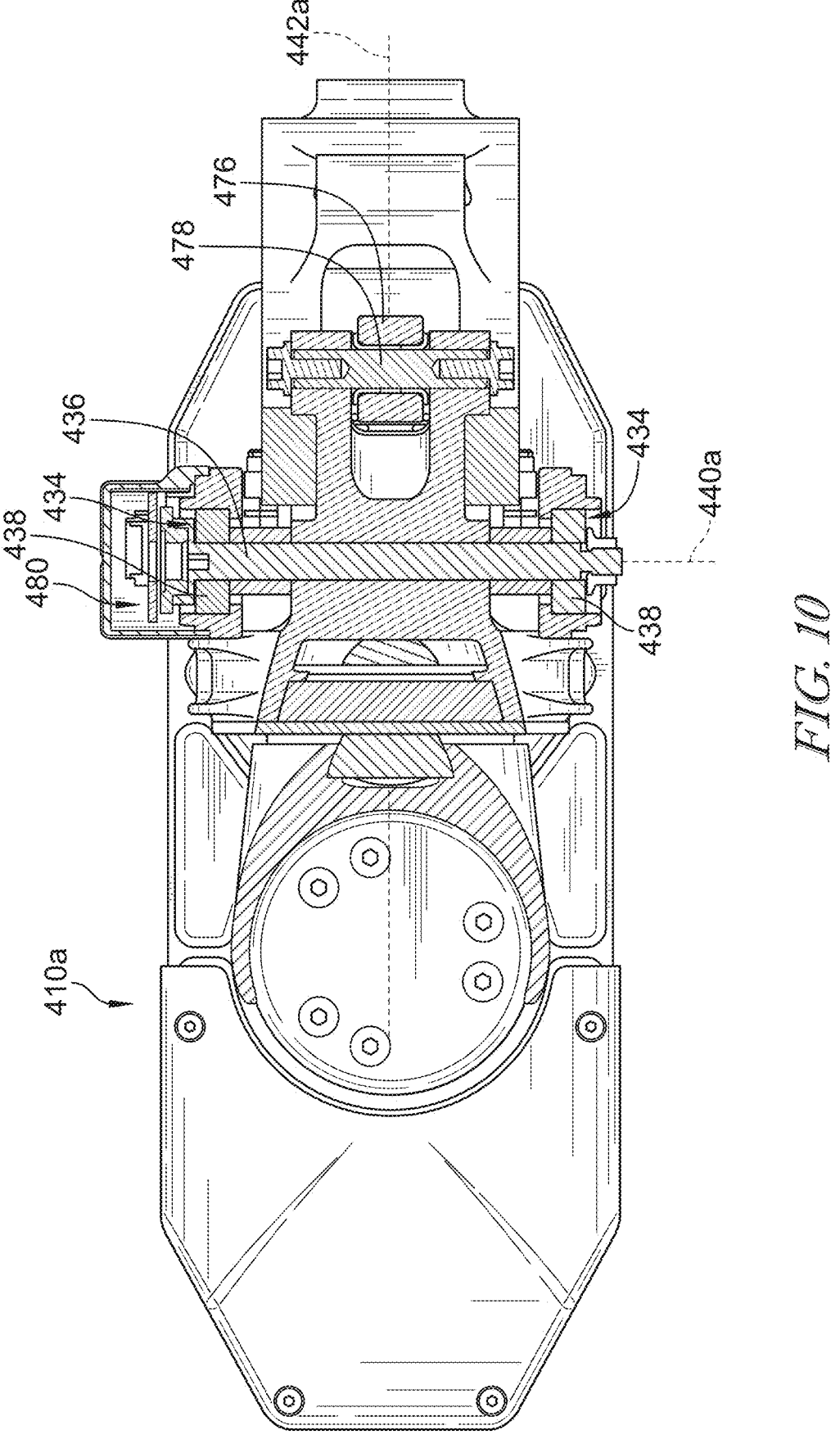
FIG. 10 is a fourth cross-sectional view of the leg taken along line 10-10 in FIG. 8 showing the first pivotal axis established by an ankle assembly bearing unit coupled to the ankle assembly and offset from the actuator shaft of the foot-flexion actuator.
Figure 11:
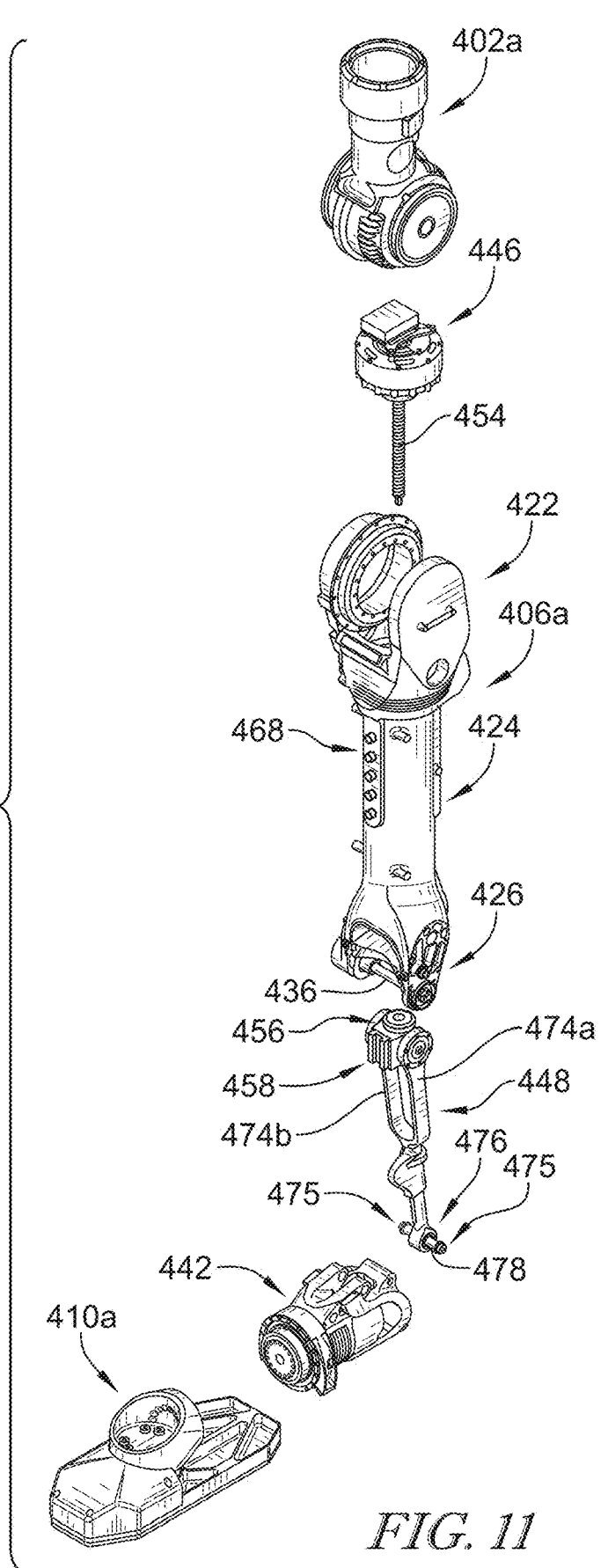
FIG. 11 is an exploded assembly view of a portion of the lower region of FIG. 3.

As shown in at least FIGS. 3, 4 and 9 which include a X, Y and Z Cartesian coordinate system. The first pivotal axis 440*a* established by the foot-flexion actuator assembly 440 extends in a first or Y direction (laterally). The second pivotal axis 442*a* established by the foot-roll actuator assembly 442 extends in a second or X direction (longitudinally, front-to-back). A third pivotal axis 446*a* established by the foot-flexion actuator motor 446 extends in a third or Z direction (vertically through the shin). The X, Y and Z directions are orthogonally arranged relative to one another when the robot 100 is in the upright standing position P1. Due to the arrangement of the various components of the robot 100, the feet 410*a*, 410*b* of the robot 100 can selectively (i) "pitch" (or "lean forward" or "lean backward," corresponding to dorsiflexion and plantar flexion) about the first pivotal axis 440*a* that is collinear with the Y axis, and/or (ii) "roll" or (or "lean left" or "lean right," corresponding to inversion and eversion) about the second pivotal axis 442*a* that is collinear with the X axis. These movements are described in greater detail below.

B. Robot Architecture

Figure 2:
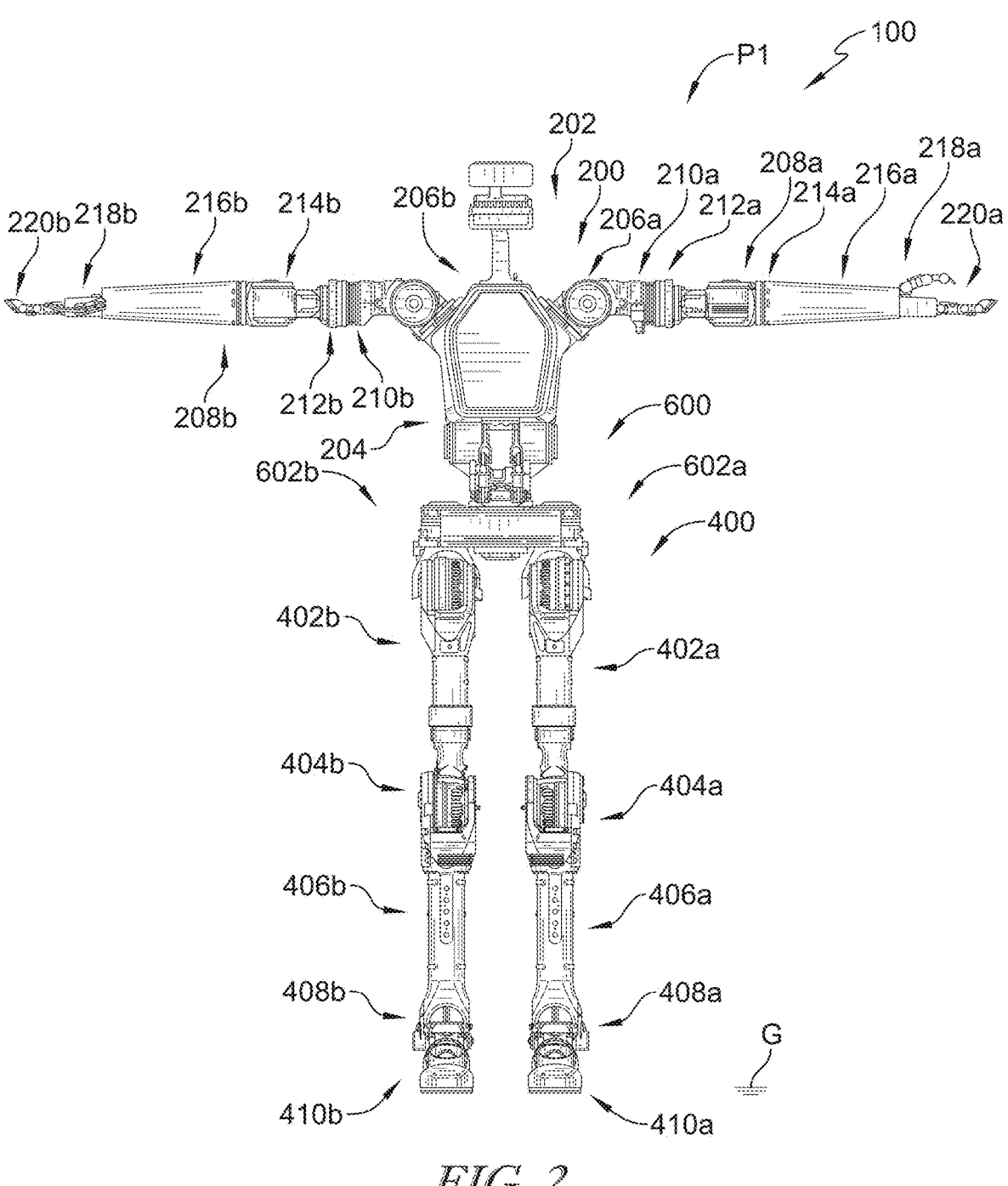
FIG. 2 is front view of the humanoid robot of FIG. 1 in the upright, standing position P1.

The humanoid robot 100 is designed to have substantial similarities in form factor and anatomy to human beings including many of the same major appendages that human beings have. The humanoid robot 100 includes an upper region 200, a lower region 400 spaced apart from the upper region 200, and a central region 600 interconnecting the upper region 200 and the lower region 400. The humanoid robot 100 is shown in FIGS. 1 and 2 in an upright, standing position P1 where a pair of feet 410*a*, 410*b* of the lower region 400 are standing on a floor or ground surface G such that the lower region 400 supports the upper region 200 and the central region 600 above the floor G. Recognizing that in the upright, standing position P1 of FIGS. 1 and 2, arms 208*a*, 208*b* of the robot 100 are outwardly extended in a nearly horizontal position, the arms 208*a*, 208*b* could be dropped such that they are adjacent to respective sides of the upper region 200 while the upright, standing position P1 is retained.

The upper region 200 includes (a) a head/neck assembly 202, (b) a torso 204, (c) left and right shoulders 206*a*, 206*b*, (d) left and right upper arm assemblies 208*a*, 208*b* that each include an upper humerus 210*a*, 210*b*, lower humerus 212*a*, 212*b*, upper forearms 214*a*, 214*b*, and lower forearms 216*a*, 216*b*, (e) left and right wrists 218*a*, 218*b*, and (f) left and right hands 220*a*, 220*b*. The lower region 400 includes a pair of legs, namely: (a) left and right thighs 402*a*, 402*b*, (b) left and right knees 404*a*, 404*b*, (c) left and right shins 406*a*, 406*b*, (d) left and right ankle assemblies 408*a*, 408*b*, and (e) left and right feet 410*a*, 410*b*. Each of the components of the upper region 200 and the lower region 400 noted above includes at least one actuator configured to move the components relative to one another. The central region 600 is located generally in, or provides, a pelvis region of the humanoid robot 100 and includes hip actuator assemblies 602*a*, 602*b* configured to control movement of the legs relative to the upper region 200/central region 600. The central region 600 is also configured to allow movement of the upper and lower regions 200, 400 relative to one another in a three-dimensional manner.

Each of the legs of the lower region 400 is substantially similar. Accordingly, only components included in one leg (typically the left leg, designated with 'a') is described below except in instances where relationships between the components of both legs are also described. The disclosure for one leg is hereby incorporated by reference for the other leg (designated with 'b').

C. Shin

As best shown in FIGS. 4-9, the shin 406a is coupled to (i) the lower portion of the thigh 402a at the knee 404a and (ii) the ankle assembly 408a. The shin 406a includes a housing 412 coupled at one end to the knee 404a and at an opposed end to the ankle assembly 408a. The housing 412 includes a frame 414 and a rear access panel 416. The frame 414 of the housing 412 includes: (i) a knee mount 422, (ii) a shin body 424, and (iii) an ankle mount 426. The knee mount 422 of the shin housing 412 includes opposed side portions 422a, 422b coupled to an output adapter or rotor 430 of a knee actuator assembly 428 included in the knee 404a. Unlike knee mounts of conventional robots that only include a single side attachment point, opposed side portions 422a, 422b of the knee mount 422 form a U-shaped design that provides additional support for the connection between the shin body 424 and the knee 404a. The rotor 430 is configured to be driven in rotation by interaction with a stator 432 included in the knee actuator assembly 428 about a knee pivot axis 404p. The shin 406a, ankle assembly 408a, and foot 410a pivot about the knee pivot axis 404p in response to actuation of the knee actuator assembly 428, providing knee flexion and extension.

The knee pivot axis 404p is located above the first and second pivotal axes 440a, 442a as shown in FIG. 4. The first pivotal axis 440a (pitch axis) is located vertically between the knee pivot axis 404p and the second pivotal axis 442a (roll axis) when the robot 100 is in the upright standing position P1. In the illustrative embodiment, the knee pivot axis 404p is aligned with the first pivotal axis 440a along a plane 441 that is substantially perpendicular to the second pivotal axis 442a when the robot 100 is in the upright standing position P1. This alignment helps in transferring load vertically. The knee pivot axis 404p is always parallel to the first pivotal axis 440a (both are pitch axes relative to their respective joints) and always perpendicular to the second pivotal axis 442a (the roll axis).

The shin body 424: (i) extends between and interconnects the knee mount 422 and the ankle mount 426, and (ii) has an elongated, substantially cylindrical shape with the interior cavity 418. The interior cavity 418 has an appreciable volume that is substantially hollow and is defined by walls with varying thicknesses and structural features. Said structural features are designed and configured to support the robot 100 and house at least a portion, and preferably the majority, of the foot-flexion actuator assembly 440 of the ankle assembly 408a. In other words, at least a portion, and preferably the majority, of the foot-flexion actuator assembly 440 is concealed within the interior cavity 418 of the shin body 424. Stated another way, at least a portion, and preferably the majority, of the foot-flexion actuator assembly 440 is secured within the frame 414 or shin housing 412. In other embodiments, the foot-flexion actuator assembly 440 may not be positioned within the shin body 424, the frame 414 or shin housing 412.

To access the interior cavity 418, an access opening 420 is formed in a rear region of the shin body 424 and is filled in, or obscured by, the removable rear access panel 416 of the shin housing 412. To install said foot-flexion actuator assembly 440 within the shin 406a, the rear access panel 416 is removed from the shin body 424, by removing elongated fasteners, thereby exposing the access opening 420. Once the access opening 420 is exposed, said foot-flexion actuator assembly 440 can be inserted through the access opening 420 and into the interior cavity 418. Once the foot-flexion actuator assembly 440 is positioned in interior cavity 418 of the shin body 424, the foot-flexion actuator assembly 440 can be secured to at least one interior wall of the shin body 424 using elongated fasteners and structural components of the shin body 424. Once the foot-flexion actuator assembly 440 is secured to and coupled with at least one interior wall of the shin body 424, the rear access panel 416 of the shin housing 412 can be secured to said shin body 424 to fill in the access opening 420 and conceal the foot-flexion actuator assembly 440 within said housing 412. This design protects the foot-flexion actuator assembly 440 from foreign objects but allows for easy access to said actuator assembly 440 for service and/or maintenance.

Figure 8:
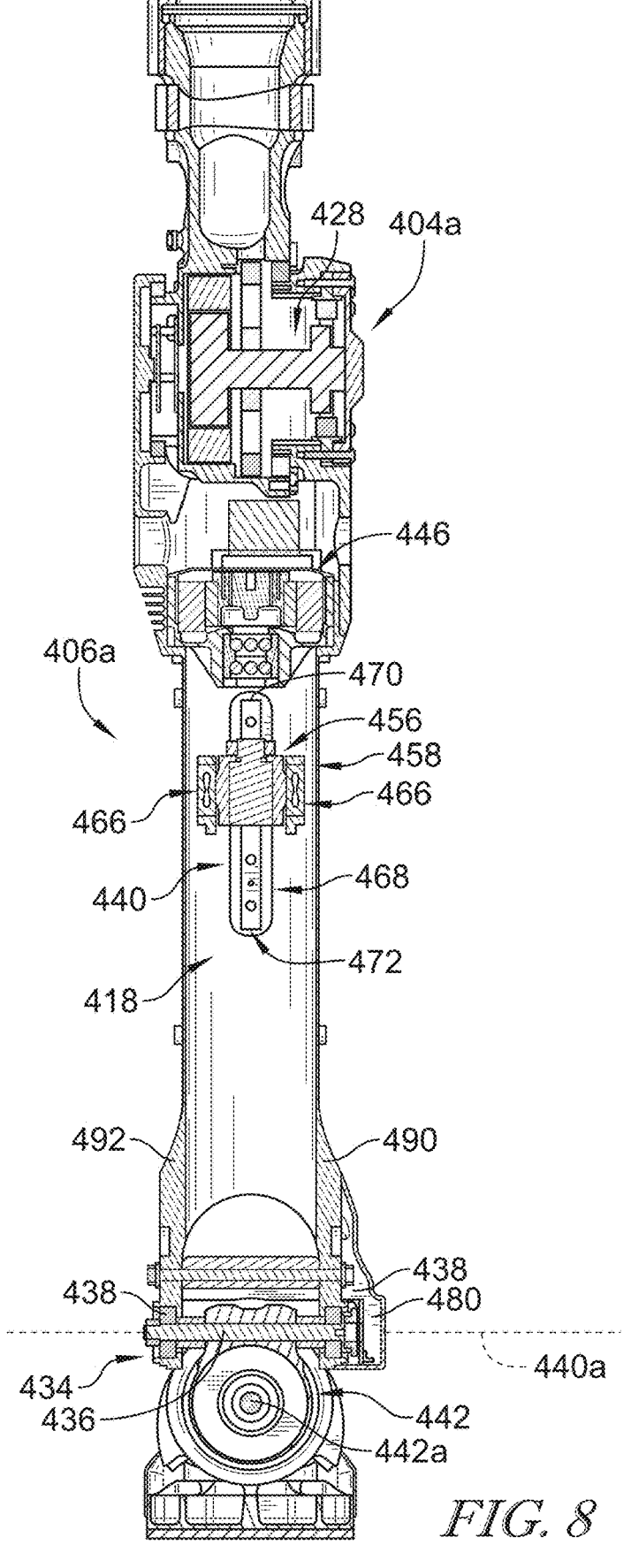
FIG. 8 is a second cross-sectional view of the leg taken along line 8-8 in FIG. 5 showing the second pivotal axis arranged below the first pivotal axis and orthogonal to the third axis.

The ankle mount 426 is: (i) coupled to a lower end of the shin body 424, and (ii) coupled to the foot-roll actuator assembly 442 of the ankle assembly 408a, which is in turn coupled to the foot 410a, as shown in FIGS. 8 and 9. The ankle mount 426 includes opposed side portions (arms 490) having mounting apertures 434 and a mounting pin 436. The mounting pin 436 is configured to span the side portions through the mounting apertures 434 and through corresponding opening(s) formed in the housing 482 of the foot-roll actuator assembly 442 (specifically, through aperture 509 in the shin mount 508). The mounting pin 436 may include roller bearings 438 on each end to facilitate smooth pivotal movement between the shin body 424 and the foot-roll actuator assembly 442. The foot-roll actuator assembly 442 may further include bearing seats to house the roller bearings 438. The mounting pin 436 establishes the first pivotal axis 440a about which the foot 410a and the foot-roll actuator assembly 442 pivot relative to the shin 406a in response to actuation of the foot-flexion actuator assembly 440 to control a pitch of the foot 410a relative to the shin 406a.

D. Ankle Assembly

The ankle assembly 408a includes the foot-flexion actuator assembly 440 and the foot-roll actuator assembly 442 as shown in FIGS. 4-9. The foot-flexion actuator assembly 440 is coupled fixedly to the shin 406a (its motor 446 and drive mechanism are housed predominantly in the shin body 424). The foot-roll actuator assembly 442 is coupled fixedly between the ankle mount 426 and the foot 410a and is coupled to the foot-flexion actuator assembly 440. The foot-flexion actuator assembly 440 is configured to control movement (pitch) of the foot 410a and the foot-roll actuator assembly 442 together about the first pivotal axis 440a to adjust a pitch of the foot 410a relative to the shin 406a. The foot-roll actuator assembly 442 is configured to control "pivotal movement" (roll) of the foot 410a about the second pivotal axis 442a to adjust a roll of the foot 410a relative to the shin 406a and the foot-roll actuator housing 482. The first pivotal axis 440a resides in a first substantially horizontal plane 443 and the second pivotal axis 442a resides in a second substantially horizontal plane 445 parallel with the first plane 443 and parallel to a plane 564 of the foot 410a resting on ground G when the robot 100 is in the upright standing position P1. The first plane 443 is located vertically above the second plane 445 when the robot 100 is in the upright standing position P1. The first and second pivotal axes 440a, 442a are always orthogonal to one another and never intersect one another. In an alternative embodiment, the location of the connector rod attachment point via mounting pin 478 may be below the first pivotal axis defined by mounting pin 436. As such, the pivot point associated with pin 478 may be below the first pivotal axis 440a. In yet another embodiment, the location of pin 478 may be forward of the first pivotal axis 440a, and either above or below the first pivotal axis 440a.

Figure 14:
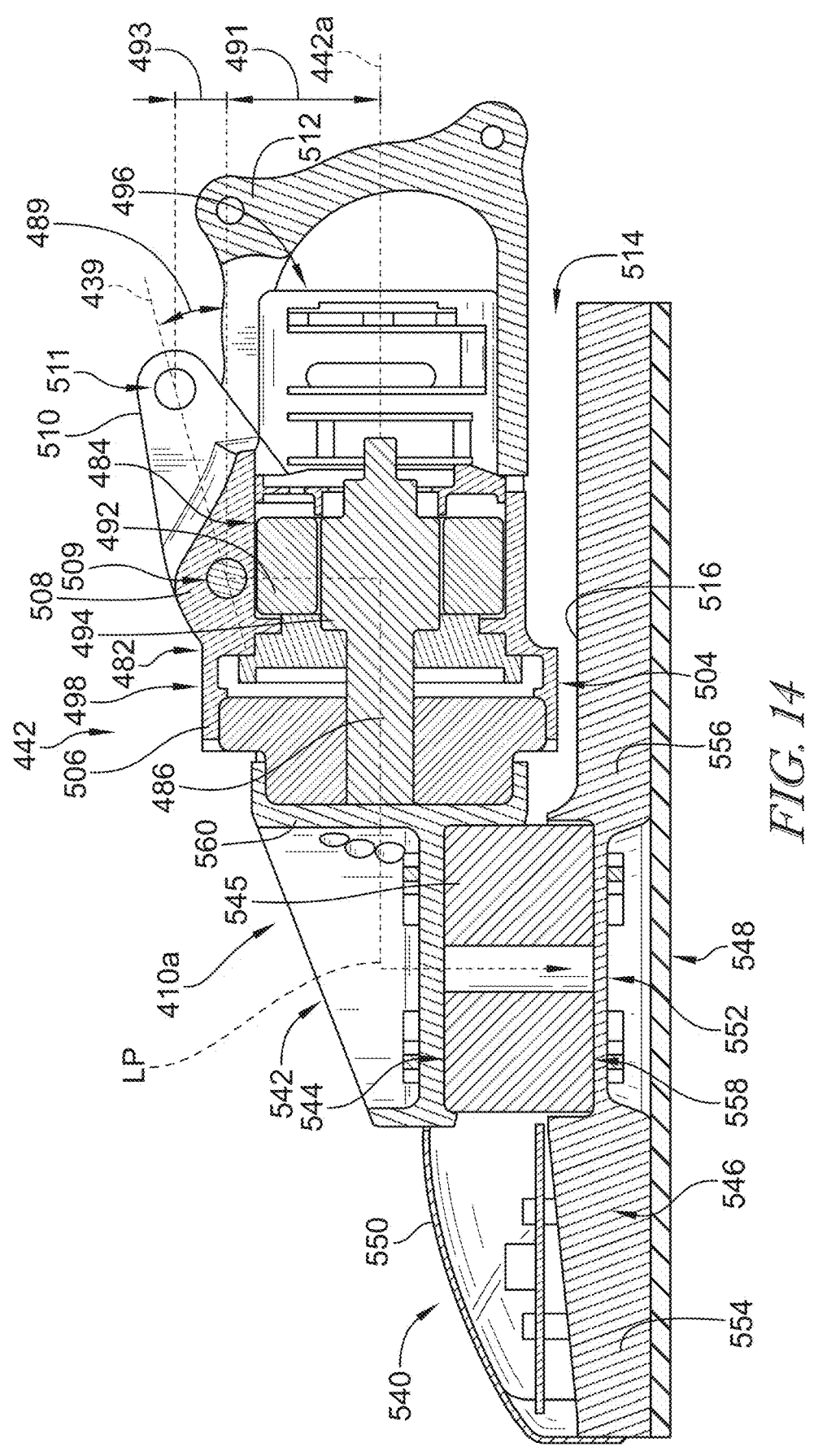
FIG. 14 is a cross-sectional view of the ankle assembly and foot taken along line 14-14 in FIG. 12 showing the foot-roll actuator of the ankle assembly including: (i) a housing coupled to a lower end of the shin and having a stator positioned therein, and (ii) a rotor coupled to the foot and for pivotable movement about the second pivot axis relative to the stator and the lower end of the shin.
Figure 15:
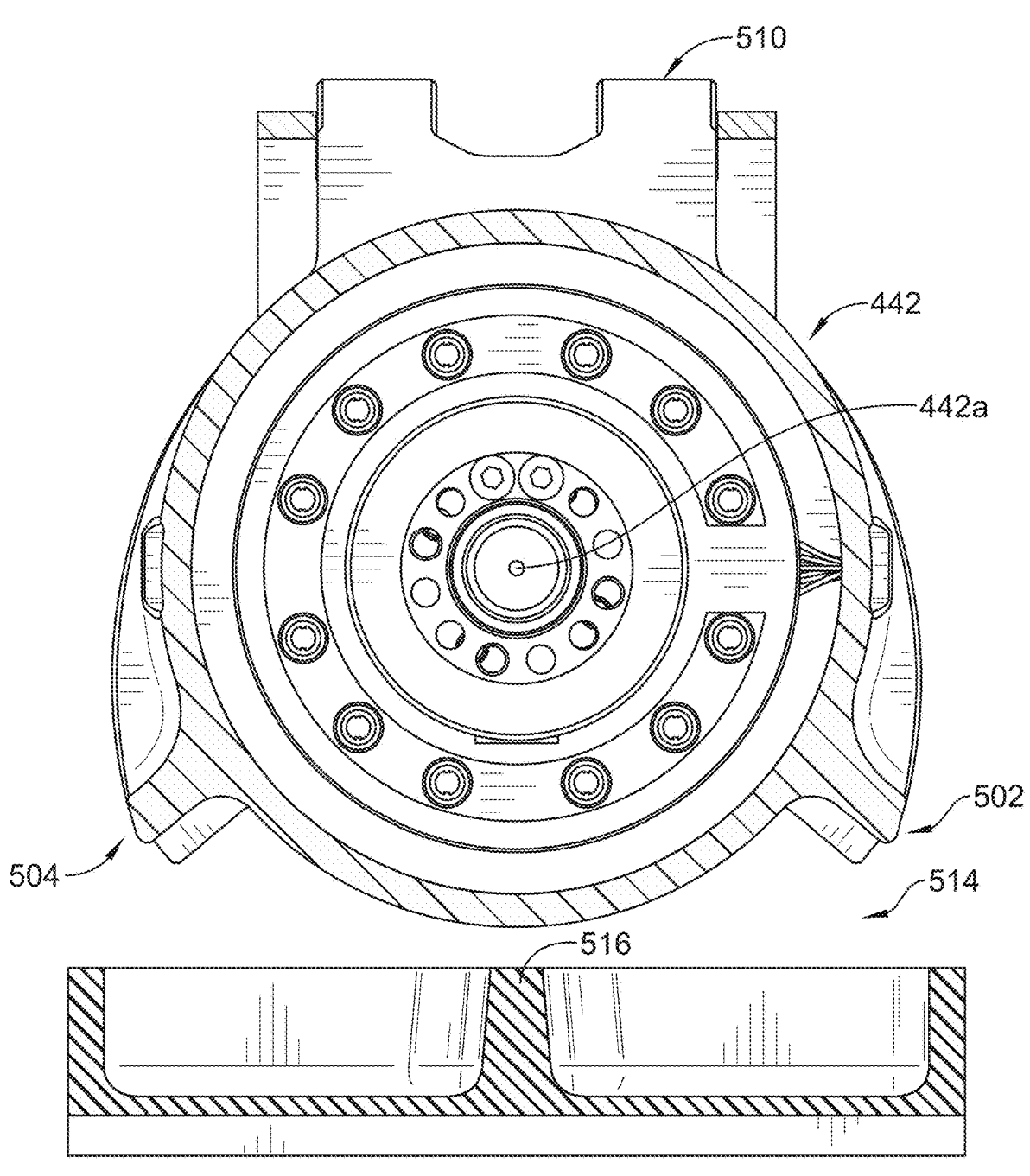
FIG. 15 is a cross-sectional view of the ankle assembly and foot taken along line 15-15 in FIG. 13.

As shown in FIG. 14, the mounting pins 436, 478 are aligned along a plane 439 that extends at an angle 489 relative to the second pivotal axis 442a (and the horizontal plane 445) when the robot 100 is in the upright standing position P1. The angle 489 is inclined in a rearward direction (pin 478 is rearward and upward of pin 436) and is about 15 degrees in the illustrative embodiment. In other embodiments, the angle 489 can be within a range of about 10 degrees to about 30 degrees. In yet another embodiment, the angle 489 may be declined. A vertical distance 491 from the second pivotal axis 442a to the first pivotal axis 440a is greater than a vertical distance 493 from the first pivotal axis 440a to the mounting pin 478 when robot 100 is in the upright standing position P1.

One of skill in the art of designing humanoid robots 100 recognizes that "pivotal movement" means, in the context of the humanoid robot 100, positive and negative angular movement about a pivotal axis defined by an actuator assembly (e.g., the foot-roll actuator assembly 442 controlling movement about axis 442a) and/or a bearing point (e.g., mounting pin 436 defining axis 440a) that (i) does not involve full rotation or 360 degrees (or more) of movement about the pivotal axis, and (ii) typically involves both positive and negative angular movement of an equal or specified degree about the pivotal axis such that the component or part subject to or implicated by the pivotal movement (e.g., the foot 410a rolling about axis 442a) returns to a neutral point or angular position of 0 degrees on the pivotal axis (e.g., the second pivotal axis 442a relative to the shin 406a). One of skill in the art further recognizes when a component or part is angularly moved less than 360 degrees (even though angular movement of 360 degrees is possible), that component/part undergoes pivotal movement.

a. Foot-Roll Actuator Assembly

The foot-roll actuator assembly 442 includes (i) a housing 482, (ii) a motor 484 (comprising stator 492 and rotor 494), and (iii) a drive shaft 486 coupled to the rotor 494, as shown in FIGS. 8-20. The housing 482 houses the motor 484 and at least a portion of the drive shaft 486. The housing 482 is pivotally coupled to the shin 406a via mounting pin 436 at the shin mount 508 and pivotally coupled to a distal end 476 of a connector rod 448 (included in the foot-flexion actuator assembly 440) via mounting pin 478 at the connector rod mount 510. Additionally, the foot-roll actuator assembly 442 does not have a separate housing within the housing 482. The shin 406a is coupled directly to the housing 482 via pin 436 such that the housing 482 provides direct support for loads transferred from the shin.

The motor 484 is configured to drive rotation of the drive shaft 486 about the second pivotal axis 442a relative to the housing 482. The foot 410a couples directly to the drive shaft 486 of the foot-roll actuator assembly 442 (via the coupling assembly 542). By pivoting the drive shaft 486 about the second pivotal axis 442a, the foot 410a rolls correspondingly relative to the shin 406a (since the housing 482 is linked to the shin). The motor 484 of the foot-roll actuator assembly 442 includes a stator 492 mounted fixedly to the housing 482 and a rotor 494 coupled to the drive shaft

486 for rotation relative to the stator 492. The stator 492 and rotor 494 can have a brushed or brushless configuration, but in the illustrative embodiment are brushless. The stator 492 is configured to electromagnetically drive rotation of the rotor 494 about the second pivotal axis 442a to cause pivoting of the drive shaft 486 and the foot 410a and adjust roll of the foot 410a relative to the shin 406a. An encoder 496 is coupled to at least one of the housing 482 (linked to the stator 492) and the rotor 494 (linked to the drive shaft 486 and foot 410a) to measure and determine the angular orientation (roll angle) of the foot 410a relative to the housing 482 or the stator 492, and thus relative to the shin 406a.

Figures 12, 13:
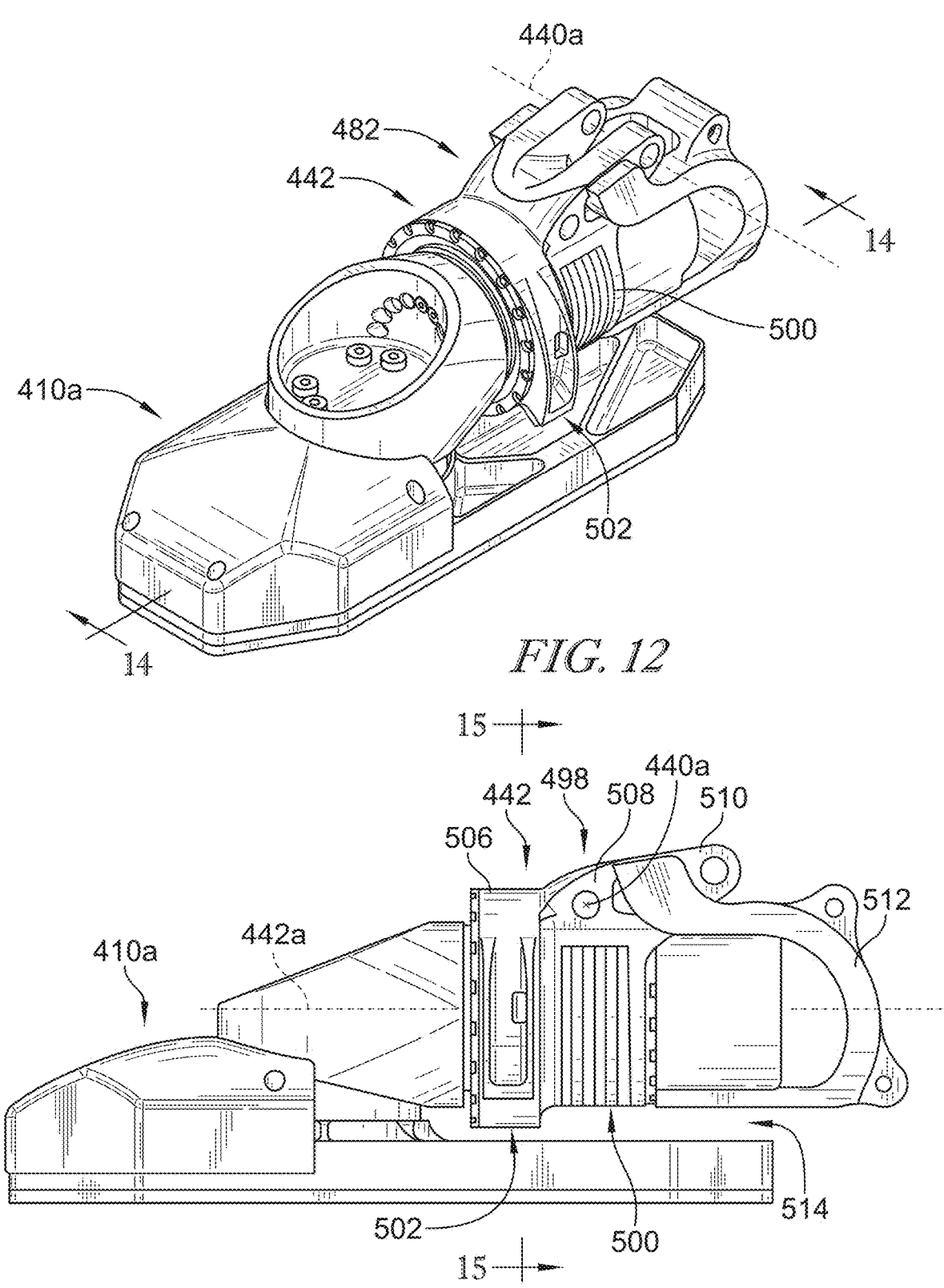
FIG. 12 is a perspective view of the ankle assembly and foot of the lower region of FIG. 3.
FIG. 13 is side view of the ankle assembly and foot of the lower region of FIG. 3.

As shown in FIGS. 12-14, the housing 482 of the foot-roll actuator assembly 442 includes a motor receptacle 498, heat-dissipation fins 500, and left and right rotation limiters 502, 504. The motor receptacle 498 houses the motor 484 (stator 492 and rotor 494) of the foot-roll-actuator assembly 442. The heat-dissipation fins 500 are formed in an external surface of the motor receptacle 498 and are configured to dissipate heat produced by the motor 484 during operation. In other words, the heat-dissipation fins 500 are configured to draw heat away from the motor 484 toward the atmosphere. The left and right rotation limiters 502, 504 are configured to physically engage a portion of the foot 410a (specifically, rotation stop 516) to block further rolling motion of the foot 410a about the second pivotal axis 442a beyond a predefined range.

The motor receptacle 498 includes a main body 506, a shin mount 508, a connector rod mount 510, and a support member 512. The main body 506 houses the motor 484 and is coupled to the heat-dissipation fins 500 and the rotation limiters 502, 504. The shin mount 508 is formed to include an aperture 509 to receive the mounting pin 436 and mount the shin 406a (via ankle mount 426) to the motor receptacle 498, establishing the first pivotal axis 440a. The connector rod mount 510 is formed to include an aperture 511 to receive the mounting pin 478 of the connector rod 448 to mount the connector rod 448 to the motor receptacle 498. The connector rod mount 510 is positioned rearward of the shin mount 508. The support member 512 is C-shaped when viewed from the side as shown in FIG. 13 and is coupled at a lower end thereof to the main body 506 and at an upper end thereof to the connector rod mount 510.

The support member 512 forms a rearwardmost portion of the motor receptacle 498 structure to guard and protect the motor 484, a Printed Circuit Board (PCB), and/or the encoder 496. The support member 512 is coupled to a forward end of the connector rod mount 510 and extends between the shin mount 508 and the connector rod mount 510 to transfer forces acting on the shin mount 508 and on the connector rod mount 510 around the motor 484 to a lower end of the main body 506. In this way, the forces acting on the shin mount 508 from the shin 406a and on the connector rod mount 510 from the connector rod 448 substantially bypass areas of the main body 506 that house the motor 484 components. The support member 512 can be omitted in some alternative embodiments.

The main body 506 of the housing 482 is cantilevered relative to the foot 410a at a forward end thereof to provide a gap 514 vertically between the motor receptacle 498 (specifically, its lower surface) and a rearward portion (i.e. a heel portion) of the foot 410a (specifically, the upper surface of the foot base structure 546). The gap 514 allows deflection of the rearward portion of the foot 410a relative to the motor receptacle 498 when the foot 410a contacts the ground G while the robot 100 is walking or standing. This provides a more natural walking appearance for the robot 100. The main body 506 is mounted to the foot 410a via the drive shaft 486 and coupling assembly 542 at a location that is approximately half of a length of the foot 410a. The gap 514 has a height between the lowest point of the foot-roll actuator assembly housing 482 and the highest point of the heel of the foot 410a directly below it that is 0.25 mm to 10 mm, preferably 0.5 mm to 8.0 mm, and most preferably 0.75 mm to 7.0 mm in the initial, upright standing position P1. Forces experienced by the motor receptacle 498 during walking may be transferred through the support member 512 to limit deflection of the main body 506 which could affect operation of the motor 484 housed therein. In some embodiments, there may be no deflection. However, in other embodiments, there may be substantial deflection wherein the main body 506 may bend such the entirety or substantially the entire gap 514 formed between the foot roll actuator housing 482 and the foot base structure 546 is eliminated due to the fact that a bottom surface of the main body 506 is positioned adjacent to the upper surface of the foot base structure 546.

The left and right rotation limiters 502, 504 are coupled to opposed sides of the main body 506. As the foot 410a rotates to the left, the left rotation limiter 502 enters the gap 514 and eventually contacts a corresponding surface on a rotation stop 516 fixed to the foot 410a in the gap 514 to block further rotation to the left about the second pivotal axis 442a. As the foot 410a rotates to the right, the right rotation limiter 504 enters the gap 514 and eventually contacts an opposite side of the rotation stop 516 in the gap 514 to block further rotation to the right about the second pivotal axis 442a. Said left and right rotation limiters 502, 504 in combination with the rotation stop 516 prevent the foot-roll actuator assembly 442 from over rotating and potentially damaging the foot-roll actuator assembly 442, the foot 410a, and/or the robot 100.

b. Foot-Flexion Actuator Assembly

As best shown in FIGS. 8 and 9, the foot-flexion, foot Y, or foot pitch actuator assembly 440 is mounted within the shin body 424 and includes a rotary motor 446 and a connector rod 448, linked by a linear transmission mechanism (ball screw 454, slide or ball nut slide 456, carrier 458). Illustratively, and unlike other actuated joints of the robot 100 which might use direct rotary actuators, the actuation mechanism involving the connector rod 448 provides a linear-type output force, although driven by the rotary motor 446. In other words, all other actuators contained in the robot 100 may be direct rotary actuators, making this pitch mechanism unique. In other embodiments, the foot-flexion actuator assembly 440 may include a different type of rotary actuator coupled to the connector rod 448. In yet another embodiment, the connector rod 448 can include a spring or other compliant joint integrated within its structure to absorb impact forces. In a further embodiment, the foot pitch actuator assembly 440 may be replaced entirely by a passive compliant joint or a spring-biased member for applications not requiring active pitch control.

The motor 446 of the foot-flexion actuator assembly 440 includes a stator 450 fixed to the shin 406a structure (within housing 412), a rotor 452 coupled magnetically to the stator 450 and configured to be driven in rotation by the stator 450 about a third pivotal axis 446a (the motor's rotation axis), and a drive shaft 454 coupled to the rotor 452 for rotation therewith about the third pivotal axis 446a. The stator 450 and rotor 452 can have a brushed or brushless configuration. Illustratively, the drive shaft 454 is a ball screw that extends downwardly away from the knee 404a, the stator 450, and the rotor 452 and toward the foot 410a within the interior cavity 418 of the shin 406a along the third pivotal axis 446a. The drive shaft 454 is coupled with the connector rod 448 via the slide 456 and carrier assembly 458, and is configured to move the connector rod 448 linearly relative to the stator 450 to change the pitch of the foot 410a about the first pivotal axis 440a. The third pivotal axis 446a (motor/screw axis) is always orthogonal to the first pivotal axis 440a (pitch axis) and the second pivotal axis 442a (roll axis) in the illustrative embodiment. In some embodiments, the third pivotal axis 446a can be angled relative to the second pivotal axis 442a within a range of about 80 degrees to about 100 degrees, although orthogonality is shown. In some embodiments, the motor 446, the drive shaft 454, and connector rod 448 mechanism can be replaced with a pre-packaged linear actuator assembly.

The foot-flexion actuator assembly 440 drives the pitch movement of the foot 410a via the connecting rod 448. The motor 446 is illustratively a brushless DC motor that drives the ball screw 454, which engages with a nut or slide 456 within a carrier 458 that pushes or pulls the connecting rod 448 to pivot the foot 410a for pitch adjustment. The brushless DC motor 446 may be enclosed in an actuator housing 460 that may be formed around the stator 450. The housing 460 of the motor 446 includes external fins 462 that act as a heat sink to increase heat transfer away from the motor 446 to the atmosphere during operation preventing overheating. The slide 456 includes a center aperture 457, typically threaded, to receive and engage the ball screw drive shaft 454. The drive shaft 454 is threaded so that rotation of the drive shaft 454 by motor 446 causes the slide or ball nut slide 456 to move upward and downward along the third pivotal axis 446a depending on the direction of rotation of the drive shaft 454. The drive shaft 454 is further supported by angular contact bearings 464 that allow for low-friction rotation of the drive shaft 454 and provide constraint for high forces in the thrust or linear direction (i.e. axial direction of the ball screw 454). The bearings 464 may be held in place by a force cell structure that includes strain gauges to sense the amount of linear force that is being transmitted through the drive shaft 454. The drive shaft 454, via the slide 456, pushes or pulls on the carrier assembly 458 that is coupled to the connecting rod 448.

The connecting rod 448 is held in place relative to the carrier 458 by bearings 466 included in the carrier 458, allowing the rod to pivot slightly relative to the carrier. As the slide 456 travels linearly along the drive shaft 454, the carrier 458 transmits this linear movement to the connector rod 448 along the general direction of the third pivotal axis 446a. The bearings 466 allow pivoting of the connector rod 448 relative to the slide 456/carrier 458 as the connector rod 448 moves up and down along the drive shaft 454, accommodating the changing angle of the rod.

The carrier assembly 458 further includes interfaces for a track 468 and limit bumpers 470, 472. The track 468 is secured to the shin body 424 structure within the interior cavity 418 to guide the upward and downward movement of the slide 456/carrier assembly 458 relative to the shin structure, preventing rotation. The slide 456/carrier assembly 458 is configured to translate along the track 468 in response to the rotation of the drive shaft 454. The connecting rod 448 pivotably couples to the slide 456/carrier assembly 458 at attachment arms 474a, 474b included at an upper end (forked end 474) of the connector rod 448 and moves linearly with the slide 456/carrier assembly 458 to affect the pitch of the foot 410a via its connection at the distal end 476. The travel of the slide 456/carrier assembly 458 is limited by physical bumpers 470, 472. An upper limit bumper 470 is positioned at an upper end of the track 468 (or carrier travel range) and a lower bumper 472 is positioned at a lower end of the track 468 (or carrier travel range). The slide 456/carrier assembly 458 engages the upper bumper 470 when the slide/carrier is raised to an upper maximum extent of its travel along the track 468 and engages with the lower bumper 472 when the slide 456/carrier assembly 458 is lowered to a lower maximum extent of its travel along the track 468, preventing damage from over-travel.

The connecting rod 448 includes a forked end 474 having the attachment arms 474a, 474b at its upper end, and a distal end 476 attached pivotally to the foot-roll actuator assembly housing 482 via pin 478. The forked end 474 may include two prongs (arms 474a, 474b) spaced apart from one another and coupled to the carrier 458 via the bearings 466. Each attachment arm 474a, 474b includes apertures in the end portions which house bearings 466 and are configured to pivotably couple to the carrier 458. For example, the attachment arms 474a, 474b may be spaced at a distance substantially similar to the width of the carrier 458 and secured to the carrier 458, perhaps by pushing apart the attachment arms 474a, 474b slightly to snap over pivot points on the carrier 458. The connecting rod 448 is held in place rotationally relative to the carrier 458 by the bearings 466 that fit into the apertures of the attachment arms 474a, 474b to facilitate the pivoting movement needed as the rod angle changes. The connecting rod 448, with its forked end 474, straddles the carrier 458 and is coupled in a position that doesn't interfere with the track 468 or the linear movement of the carrier 458 on the track 468. The distal end 476 of the connecting rod 448 includes an aperture and bearings 475 and is configured to pivotably couple with the foot-roll actuator assembly housing 482. The distal end 476 of the connecting rod 448 couples to a pin 478 that extends through corresponding openings in the distal end 476 (housing bearings 475) and the connector rod mount 510 of the foot-roll actuator assembly housing 482. The distal end 476 is not forked and instead is a single clevis end centered between projections of the connector rod mount 510 of the actuator housing 482 of the foot roll actuator assembly 442.

Figure 16:
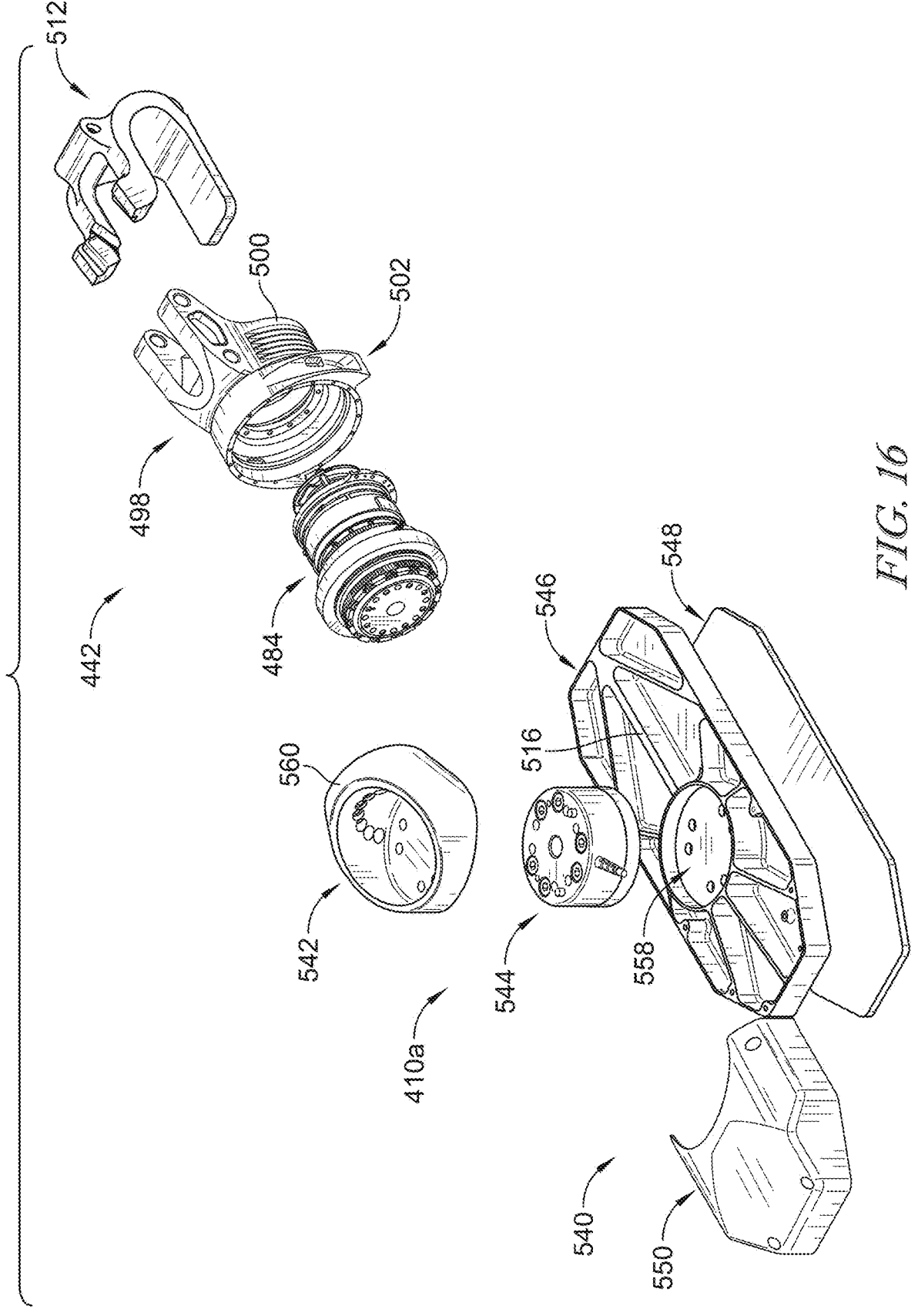
FIG. 16 is an exploded assembly view of the ankle assembly and foot of FIG. 12.
Figure 18:
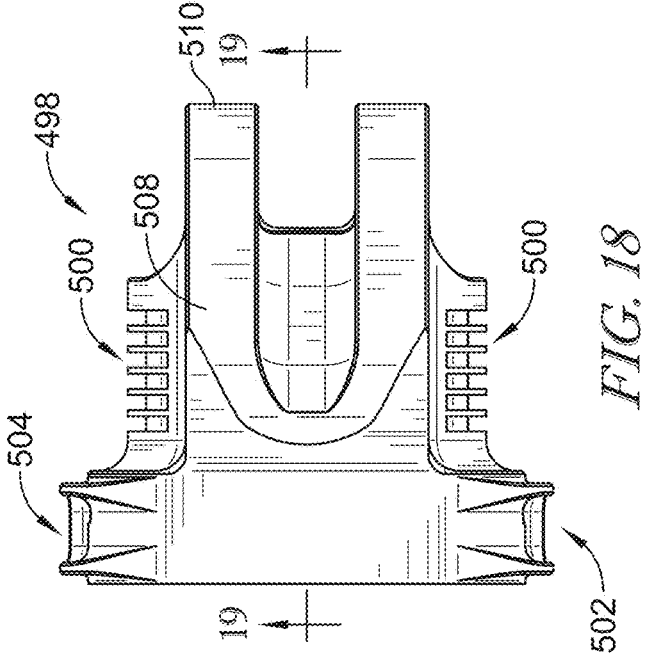
FIG. 18 is a top view of the actuator housing of the foot-roll actuator of FIG. 17.
Figure 17:
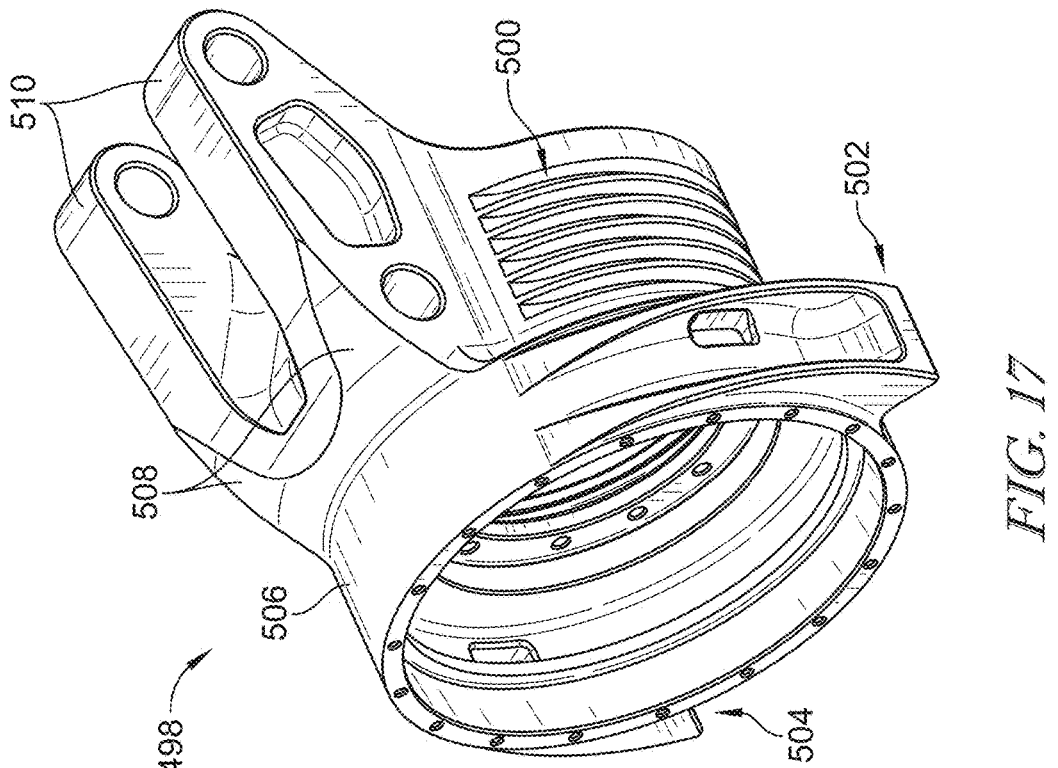
FIG. 17 is a perspective view of the housing of the foot-roll actuator of the ankle assembly.
Figures 19, 20:
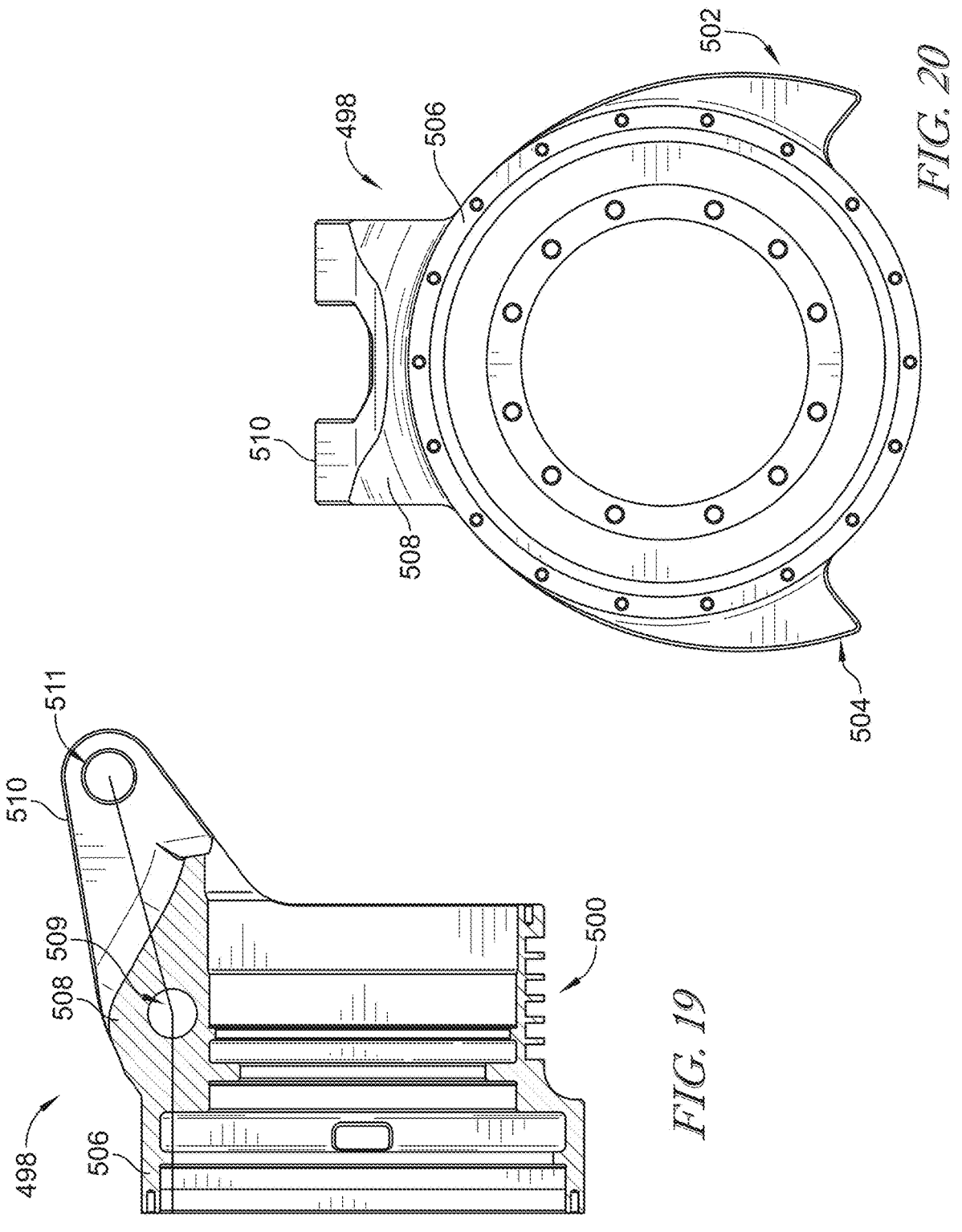
Figure 21:
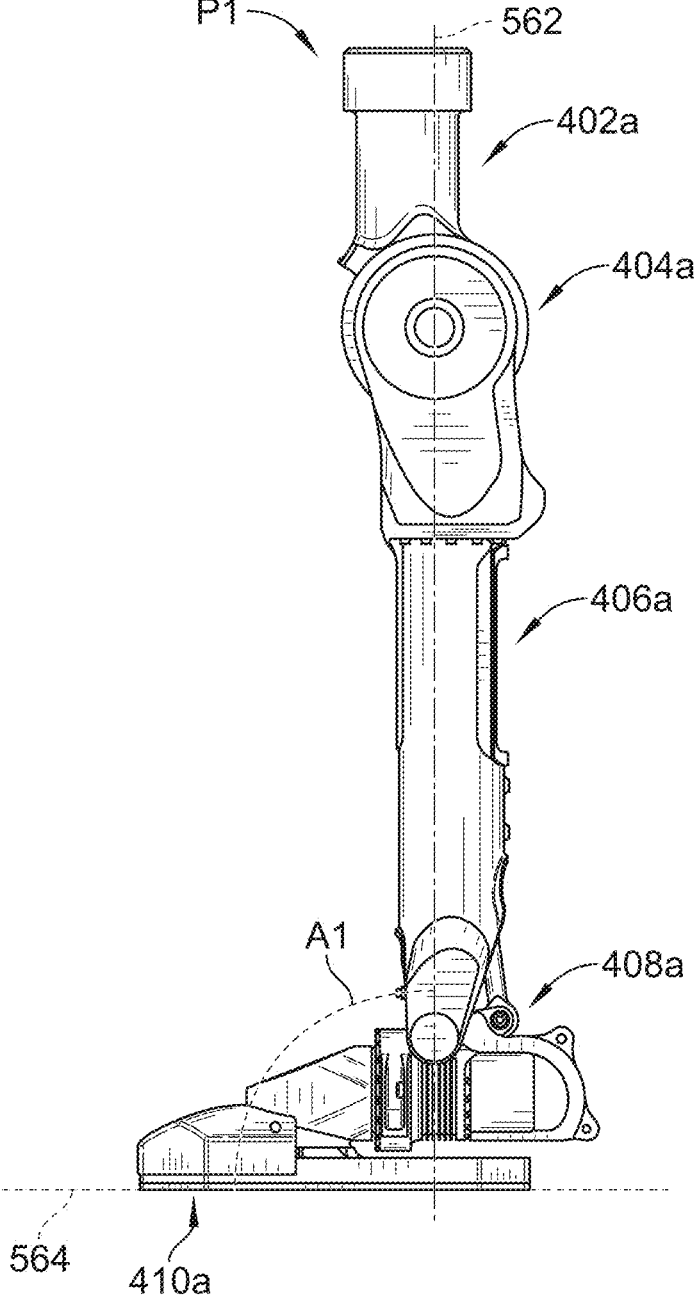
FIG. 21 is a side view of the leg of FIG. 4 in the upright, standing position P1 showing an angle A1 between a first plane extending through a knee pivot axis and the first pivotal axis and a second plane co-planar with a bottom surface of the foot.

As shown best in FIGS. 16-18, the ankle mount 426 of the shin 406a is configured to receive a mounting pin 436 that establishes the first pivotal axis 440a (pitch axis). The mounting pin 436 is illustratively a single cylindrical pin that spans the complete distance between the two projections that form the connector rod mount 510. In other embodiments, the mounting pin 436 may be replaced by two shorter pins (stub shafts) to couple each side of the ankle mount 426 to each side of the connector rod mount 510. The ankle mount 426 is configured such that the ankle mount 426 straddles a portion of the housing 482 of the foot-roll actuator assembly 442. The ankle mount 426 side portions and the shin mount 508 of the housing 482 of the foot-roll actuator assembly 442 each include corresponding apertures (434 and 509 respectively) that receive the mounting pin 436 to pivotally mount the shin 406a to the housing 482 of the foot-roll actuator assembly 442. The mounting pin 436 may include roller bearings 438 on each end, housed within the ankle mount 426 portions, and the shin mount 508 of the housing 482 may further include bearing seats to interface with these roller bearings 438 to facilitate low-friction movement therebetween. The ends of the mounting pin 436 and exposed roller bearings 438 may be covered by ankle side covers attached to the ankle mount 426 for protection. An encoder 480 is coupled at one end of the pin 436 (or senses rotation relative to it) and tracks the angular orientation of the housing 482 relative to the shin 406a to determine the pitch angle of the foot 410a (since the housing 482 and foot 410a pitch together). The ankle mount 426 may include two ankle mount arms 490 spaced apart and extending downward from the shin body 424 to mount to the housing 482 via pin 436.

As shown in FIGS. 9 and 14, the mounting pin 478 coupling the connecting rod 448 to the housing 482 is positioned at a distance from the mounting pin 436 coupling the ankle mount 426 of the shin 406a to the housing 482. The shin housing 412, via ankle mount 426, being pivotably fixed relative to the housing 482 by the mounting pin 436 defining the first pivotal axis 440a about which the housing 482 and the attached foot 410a pivots relative to the shin 406a. Shown with the leg in a normal upright standing position P1, the mounting pin 478 is positioned rearward and upward from the mounting pin 436 to provide a specified kinematic linkage and range of motion for the foot 410a pitch control. For example, in the initial position P1, the plane 439 that passes through both the mounting pins 478, 436 may be angled between about 16-24 degrees, preferably between about 18-22 degrees with respect to the sole plane 564 of the foot 410a as shown in FIG. 14 (angle 489 is shown relative to axis 442a, which is parallel to plane 564 in this view). The initial position P1 is defined when the robot 100 is standing in the upright standing position P1 balancing on ground G in a stationary position, as shown in at least FIGS. 1-3. This geometric relationship positions the connector rod 448 at an angle relative to the third pivotal axis 446a (the vertical Z-direction) when viewed from the side. The angle changes as the motor 446 of the foot-flexion actuator assembly 440 drives the connector rod 448 upward and downward relative to the drive shaft 454 (moving linearly along the Z-direction). In the illustrative embodiment, the connector rod 448 extends at an angle to the third pivotal axis 446a (vertical) within a range of about 0 degrees to about 30 degrees when the robot 100 is in the upright standing position P1. In some embodiments, the angle is about 5 degrees to about 25 degrees. In some embodiments, the angle is about 10 degrees to about 20 degrees. In some embodiments, the angle is about 10 degrees to about 15 degrees. In some embodiments, the angle is about 15 degrees to about 25 degrees. The connector rod 448 is also arranged at an angle to the second pivotal axis 442a (horizontal, X-direction) within a range of about 60 degrees to about 90 degrees, or about 75 degrees to about 85 degrees, when the robot 100 is in the initial, upright standing position P1 (being nearly vertical, its angle to the horizontal X-axis is near 90 degrees).

E. Over-Rotation Prevention System

As shown in FIGS. 4, 5, and 6, the leg includes an over-rotation prevention system for the knee joint that limits pivotal movement around the knee pivot axis 404p. A first or frontal stop mechanism is positioned in the frontal region of the shin 406a near the knee 404a, and a second or rear stop mechanism is positioned in the rear region of the shin 406a near the knee 404a.

The leg includes a frontal stop that is formed from an upper end stop 520 and a lower end stop 528. The upper end stop 520 is formed as an external extent or feature of the lower thigh housing 402a. Said upper end stop 520 includes an upper tapered projection 522 that extends from the housing 402a structure and includes a lateral wall 524 that includes an upper contact surface 526. In addition to the upper end stop 520, the shin housing 412 includes a lower end stop 528. Like the upper end stop 520, the lower end stop 528 includes a lower tapered projection 530 that extends from the shin body 424 and includes a lateral wall 532 that includes a lower contact surface 534. The upper and lower end stops 520, 528 and their respective upper and lower contact surfaces 526, 534, are configured to prevent the knee actuator 428 from over-rotating in the extension direction (hyperextension). In particular, when the knee 404a is hyperextended, the upper and lower contact surfaces 526, 534, impact each other, which physically limits further movement in that direction. The leg also includes a rear stop that is formed from an upper end stop 536 (on the thigh structure) and a lower end stop 538 (on the shin structure). Like the frontal stop mechanism, the rear upper and lower end stops 536, 538 are configured to contact each other when the robot 100 bends its knees 404a, 404b too far into flexion; thereby limiting further movement.

F. Foot

As shown in FIGS. 4-12, the combination of the ankle assembly 408a and the foot 410a form a platform that is designed to be coupled to said shin 406a and is designed to support the robot 100 on the ground G. In particular, the shin 406a is directly coupled pivotally to the ankle assembly housing 482 in two locations (at the first pivotal axis 440a via pin 436, and indirectly via the foot-flexion actuator 440 linkage terminating at pin 478). However, said shin 406a is not directly coupled to the foot 410a. Instead, the foot 410a is indirectly coupled to the shin 406a via the intermediate ankle assembly 408a (specifically, through the foot-roll actuator's drive shaft 486). This configuration allows the robot 100 to alter the pitch of the foot 410a by actuating the foot-flexion actuator 440, which changes the pitch angle of the entire ankle assembly 408a (including housing 482) relative to the shin 406a about axis 440a. However, the robot 100 cannot alter the pitch of the foot 410a without changing the pitch of the ankle assembly 408a housing 482 relative to the shin 406a. In contrast, the robot 100 can change the roll of the foot 410a (by actuating the foot-roll actuator 442 to rotate drive shaft 486 about axis 442a) without changing the roll angle of the ankle assembly 408a housing 482 relative to the shin 406a (as roll occurs about axis 442a, internal to the housing 482 assembly). This independent control over the pitch and roll of the foot 410a provides the disclosed robot 100 with a substantial benefit over conventional robots that cannot perform this decoupled movement, due to the fact it allows said robot 100 to provide more precise control of the position and orientation of the foot 410a and its configuration with respect to the shin 406a and the overall robot 100 posture.

As shown in FIGS. 14 and 16, the foot 410a includes (i) a foot housing 540 (comprising base 546, sole 548, shell 550), (ii) a coupling assembly 542, and (iii) a sensor assembly 544. In particular, the foot housing 540 of the foot 410a includes a foot base structure 546, a sole 548, and a shell 550. The foot base structure 546 of the foot 410a includes an elongated plate that is substantially flat on a bottom side (where the sole 548 attaches) and having various contours and mounting structures on the opposite top side. The foot base structure 546 may include a sensor portion 552, a toe portion 554, and an actuator interface portion 556 (where coupling assembly 542 attaches). The actuator coupling assembly 542 and the sensor assembly 544 are coupled to the foot base structure 546. The foot-roll actuator assembly 442 drive shaft 486 is cantilevered to the coupling assembly 542. The shell 550 covers only a toe portion of the foot 410a in this illustration and does not cover the sensor assembly 544 area. In some embodiments, the shell 550 may cover more portions of the foot 410a and can extend the entire length of the foot 410a. The toe portion

554 can bend during walking and can be curved to facilitate roll-over motion. Likewise, the heel portion of the foot base structure 546 can also be curved such that the foot base structure 546 forms a shoe-like structure profile.

The sensor assembly 544 may include a force-torque sensor 545 and, preferably, is a 6-axis sensor that can measure forces in three orthogonal directions (Fx, Fy, Fz) and torques about those three axes (Mx, My, Mz). As such, the sensor assembly 544 is positioned in the curvilinear load path LP (e.g., a non-linear path relative to the main leg axis) transmitting forces through the foot-roll actuator assembly 442 connection from the shin 406a to the foot base structure 546 contacting the ground G. In other words, this cantilevered mounting design creates a bending moment at the sensor assembly 544 location, offset from the vertical plane 441 extending between the knee pivot axis 404p and the first pivot axis 440a, allowing the sensor 545 to measure these moments effectively. The sensor portion 552 of the foot base structure 546 includes a sensor receptacle 558 formed in the foot base structure 546 designed to house the sensor 545. The actuator coupling assembly 542 is coupled to the force-torque sensor 545, which is received into the sensor receptacle 558 and coupled securely to the foot base structure 546. The force-torque sensor 545 is substantially centered within the foot 410a (mediolaterally and anteroposteriorly) and configured to measure forces and torques exchanged between the robot 100 and the ground G during interaction. The force-torque sensor 545 can also measure moments/stresses/strains acting on the coupling assembly 542 from the foot-roll actuator assembly 442 drive shaft 486 due to the cantilevered mounting of the foot-roll actuator assembly 442 output to the coupling assembly 542. The sensor assembly 544 and actuator coupling assembly 542 may be enclosed by a shell (like shell 550 or an extension thereof) that extends from the front of the foot base structure 546 towards the foot-roll actuator assembly 442. The actuator coupling assembly 542 includes an input mount 560 configured to interface rigidly with the output drive shaft 486 of the foot-roll actuator assembly 442 of the ankle assembly 408a. The sole 548 is formed on or attached to the bottom side of the foot base structure 546, providing the contact surface with the ground G. The bottom surface of the sole 548 may also include a tread pattern to provide better traction or grip with the floor or ground. In an alternative embodiment, the foot 410a can be coupled to both sides of the housing 482 and the sensor assembly 544 can be is positioned directly between the apertures 509 and 511.

The sensor assembly 544 can include strain gauges. The strain gauges included in the sensor assemblies 544 may be any type of strain gauge including: (i) linear strain gauges, (ii) double linear strain gauges, (iii) shear or torsional strain gauges, (iv) rosette strain gauges (T (or Tee) shaped, rectangular shaped, delta shaped, stacked), (v) diaphragm strain gauges, (vi) biaxial strain gauges, (vii) bi-directional strain gauges, (viii) stacked strain gauges, (ix) cross strain gauges, (x) double shear configurations, (xi) circular gauges, (xii) any hybrid or combination thereof, and/or (xi) any other suitable strain gauge type that is known to one of skill in the art. The strain gauges may be arranged in different Wheatstone bridge configurations including: (i) quarter-bridge configurations, (ii) half-bridge configurations, and/or (iii) full-bridge configurations.

The strain gauges may also be foil strain gauges, semiconductor strain gauges, thin-film strain gauges, ink based strain gauges, thick-film strain gauges, optical strain gauges, nanocomposite strain gauges, and/or any combination or hybrid thereof. Further, the strain gauges may be directly integrated into the housings (interior or exterior surfaces of foot housing 540 or coupling 542), coupled to said housings (interior or exterior) after the housing is manufactured, coupled to another internal structure (e.g., a dedicated sensing element, bridge, spring, etc.) positioned within the housing, integrated into or coupled to the motor or motor housing, positioned between housing components, and/or any other known configuration or combination thereof for force-torque sensing. The foil strain gauges may be made from or include: (i) foils that may be or may include constantan (copper-nickel alloy) karma (nickel-chromium alloy) isoelastic (nickel-iron alloy) evanohm (nickel-chromium alloy) nichrome v (nickel-chromium alloy), and (ii) carrier that may be or may include polyimide film, epoxy or phenolic resin, glass-fiber reinforced epoxy, ceramic backing, and/or polyurethane. Finally, the strain gauges may be any gauge that meets, uses, and/or was tested with at least one of the flowing standards: ASTM E251-13 (2018), Standard Test Methods for Performance Characteristics of Metallic Bonded Resistance Strain Gages, ASTM International; ISO 376:2011, Metallic materials—Calibration of force-proving instruments used for the verification of uniaxial testing machines; ISO 9513:2012, Metallic materials—Calibration of extensometer systems used in uniaxial testing; VDI/VDE 2635 Blatt 2, Experimental structural analysis—Recommendation on the implementation of strain measurements at high temperatures; IEC 61298-3:1998, Process measurement and control devices—General methods and procedures for evaluating performance—Part 3: Tests for the effects of influence quantities, DIN 51301, which is hereby incorporated by reference for all purposes. The strain gauges may be used in combination with other sensors in the sensing assembly or at alternate locations in the robot.

It should be understood that other sensors and/or technology may be used instead of or in combination with the sensor assemblies discussed above. Other strain gauge technology that may be used includes: (i) MEMS-based strain gauges, (ii) nanocomposite strain gauges, (iii) thin-film or thick-film strain gauges (e.g., C4A Series or EA Series from Vishay Precision Group, RF9 Series or Y Series from Hottinger Brüel & Kjær, KFG Series or KFR Series from Kyowa Electronic Instruments, TFSG Series from BCM Sensor Technologies, SGT Series or KFH Series from Omega Engineering, ELF Series or EPL Series from Meggitt Sensing Systems, or any other known manufacturer), (iv) inductive strain gauges, (v) capacitive strain gauges, (vi) piezoelectric strain gauges, (vii) optical fiber strain gauges, (viii) semiconductor strain gauges, and/or (ix) a hybrid or combination thereof.

G. Kinematics

As best shown in FIGS. 21-30, the ankle assembly 408a is configured to adjust a pitch of the foot 410a using the foot-flexion actuator assembly 440 and independently adjust a roll of the foot 410a using the foot-roll actuator assembly 442. By changing the pitch of the foot 410a (actuating 440), the foot 410a moves correspondingly with the foot-roll actuator assembly housing 482 together relative to the shin 406a about axis 440a. Changing a roll of the foot 410a (actuating 442) does not cause movement of the foot-flexion actuator assembly 440 components or the housing 482 relative to the shin 406a; roll happens about axis 442a, effectively between the foot 410a and the housing 482.

a. Ankle Pitch

As shown best in the side views, represented by FIGS. 21-25, the foot-flexion actuator assembly 440 is configured to adjust a pitch of the foot 410a and the foot-roll actuator assembly housing 482 together, to change an angle A1, A2, A3, A4, A5, between a first plane 562 (representing the shin orientation, extending through the knee axis 404p and the first pivotal axis 440a) and a second plane 564 (representing the foot orientation, co-planar with a lower surface of the foot sole 548). Angle A1 corresponds with the upright standing position P1 and is about 90 degrees but can be within a range of about 80 degrees to about 100 degrees depending on the robot's nominal posture.

Figures 22, 23:
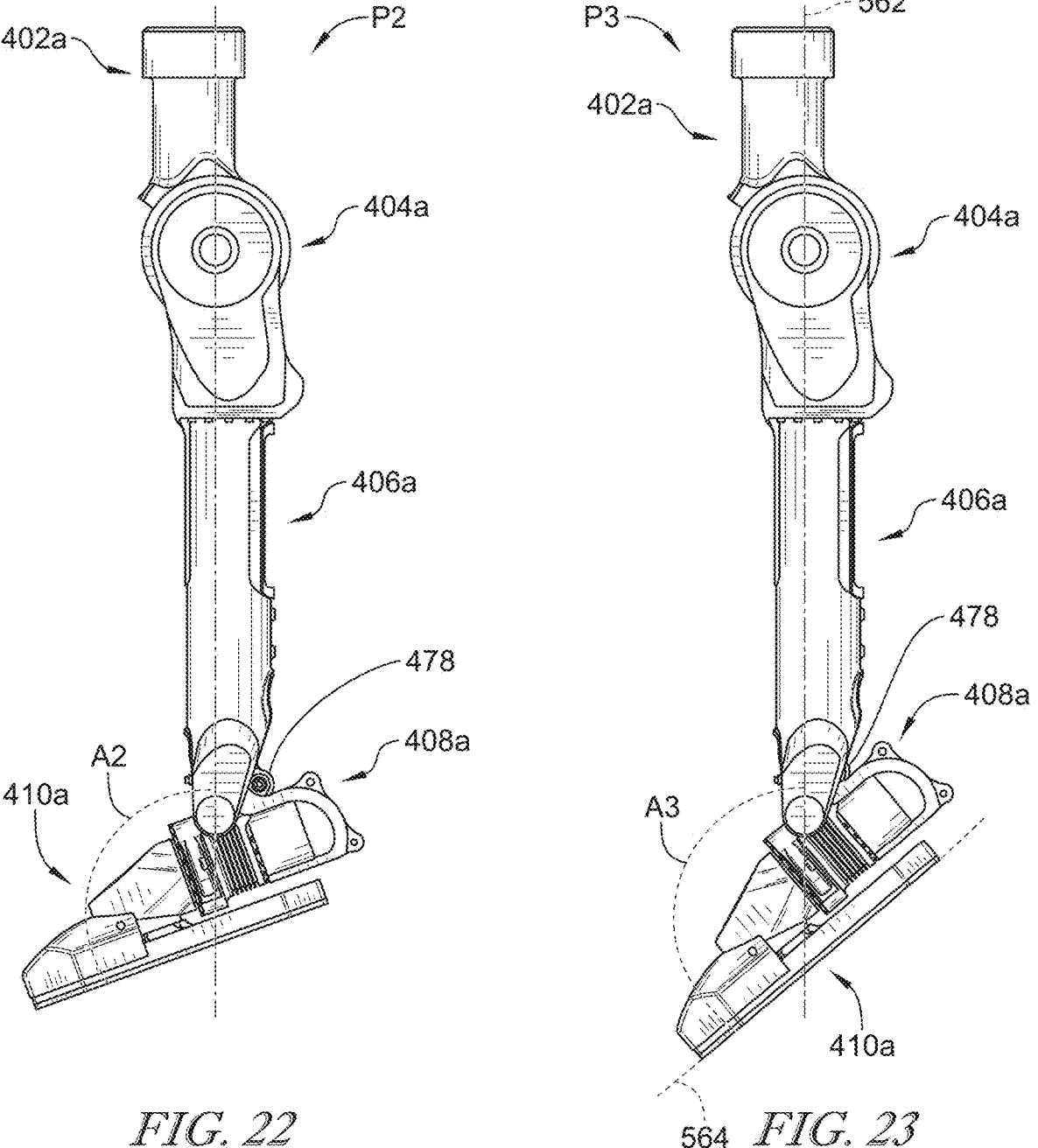
FIG. 22 is a side view of the leg of FIG. 22 showing the foot in a partially flexed, plantar flexion position P2 showing an angle A2 between the first plane and the second plane.
FIG. 23 is a side view of the leg of FIG. 22 showing the foot in a maximum flexed, plantar flexion position P3 showing an angle A3 between the first plane and the second plane.

The foot-flexion actuator assembly 440 is configured to transmit linear movement via the connecting rod 448 to adjust the pitch angle (A1-A5) of the foot 410a relative to the shin 406a. As discussed above, the foot-flexion actuator assembly 440 converts rotational movement from motor 446 to linear movement via a ball screw 454 driving a slide 456/carrier assembly 458. As the ball screw 454 rotates in a first direction, the slide 456 may travel up the ball screw 454 (along axis 446a), moving the carrier 458 up the track 468, and pulling the connecting rod 448 therewith. The upward movement of the connecting rod 448, pulling on the housing 482 at pin 478 (which is rearward of the main pivot pin 436), causes the housing 482 and the attached foot 410a to pivot about the first pivotal axis 440a (defined by mounting pin 436) relative to the shin 406a, thus causing the front section or toe box of the foot 410a to pitch downward (plantar flexion). For example, FIG. 22 shows the foot 410a flexed downward from the initial position P1 by about 20 degrees to a partial plantar flexion position P2, forming angle A2 greater than angle A1. In FIG. 23, the foot 410a is shown in a maximum plantar flexion position P3, about 40 degrees from normal P1, forming angle A3 greater than angles A1 and A2. This upward movement of the connector rod 448 also causes the mounting pin 478 to move upwardly and arc about the first pivotal axis 440a in a first or counterclockwise direction (when viewed from the left side as in FIG. 5).

The converse applies for dorsiflexion (pitching the toes upward). As the ball screw 454 rotates in a second, opposite direction, the slide 456 may travel down the ball screw 454, moving the carrier 458 down the track 468, and pushing the connecting rod 448 therewith. The downward movement of the connecting rod 448 pushes on the housing 482 at pin 478, causing the housing 482 and attached foot 410a to pivot about the first pivotal axis 440a with respect to the mounting pin 436, thus causing the front section or toe box of the foot 410a to pitch upward. FIG. 24 shows the foot 410a flexed about 20 degrees upward from normal P1 to a partial dorsiflexion position P4 forming angle A4 less than angle A1. FIG. 25 shows the foot 410a flexed about 40 degrees upward from normal P1 (or potentially up to 60 degrees as mentioned in source) in a maximum dorsiflexion position P5, forming angle A5 less than angles A1 and A4 (and A2, A3). The range of motion for foot pitch is stated as about-40 degrees (plantar flexion) to about +60 degrees (dorsiflexion) relative to the initial position P1. This downward movement of the connector rod 448 also causes the mounting pin 478 to move downwardly and arc about the first pivotal axis 440a in a second or clockwise direction (when viewed from the left side).

H. Ankle Roll

Figures 26, 27:
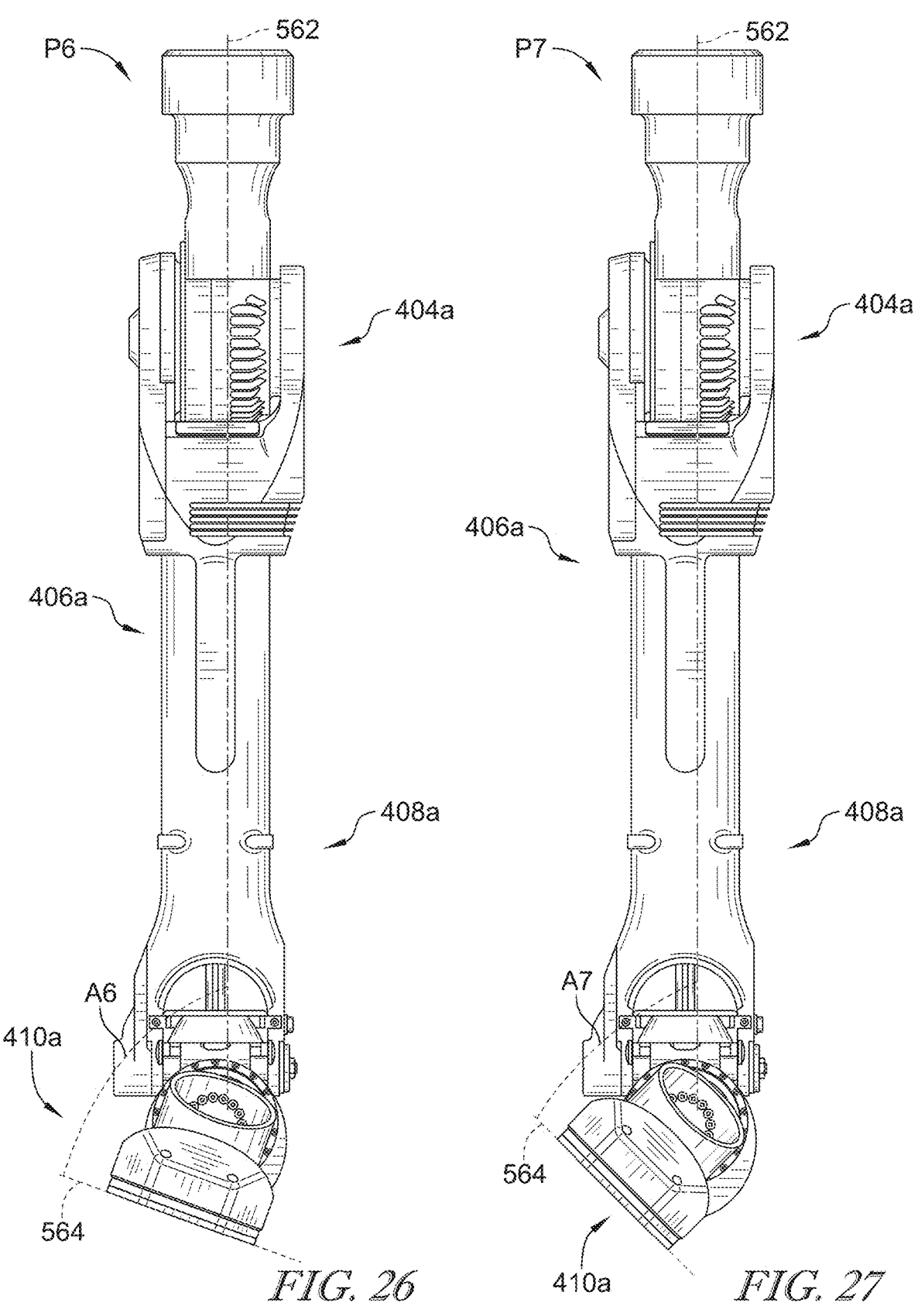
FIG. 26 is a front view of the leg of FIG. 22 showing the foot rolled to a first side in a partially flexed position P6 showing an angle A6 between the first plane and the second plane.
FIG. 27 is a front view of the leg of FIG. 22 showing the foot rolled to the first side in a maximally flexed position P7 showing an angle A7 between the first plane and the second plane.

As best shown in the front views, conceptually represented by FIGS. 26-29, the foot-roll actuator assembly 442 is configured to drive pivotal movement (roll) of the foot 410a about the second pivotal axis 442a relative to the ankle assembly housing 482 (and thus relative to the shin 406a). FIG. 26 shows a front view of the foot 410a rotated in a first direction (e.g., clockwise from the robot's perspective, causing inversion or medial tilt) from the initial position P1 (FIG. 6) to a first partial roll position P6, forming an angle A6 between the shin plane representation 562 and the foot sole plane 564 that appears less than 90 degrees from this front view (indicating roll). FIG. 27 shows a front view of the foot 410*a* rotated further in the first direction to a first maximum rotation or maximum roll (inversion) position P7, forming an angle A7 between planes 562, 564 less than angle A6. FIG. 28 shows a front view of the foot 410*a* rotated in a second, opposite direction (e.g., counter-clockwise, causing eversion or lateral tilt) from the initial position P1 (FIG. 6) to a second partial roll position P8, forming an angle A8 between planes 562, 564 also appearing less than 90 degrees but tilted the opposite way compared to P6. FIG. 29 (conceptually) shows a front view of the foot 410*a* rotated further in the second direction to a second maximum rotation or maximum roll (eversion) position P9, forming an angle A9 between planes 562, 564 less than angle A8. The foot-roll actuator assemblies 442 allow the robot 100 to perform actions like swaying left and right to maintain balance while in a stationary position on the ground G in the upright standing position P1, or to adapt the foot angle to uneven terrain. Due to the roll occurring about the X-axis (axis 442*a*), the lateral edges of the foot 410*a* never cross into or over the first pivotal axis 440*a* (Y-axis) when the foot 410*a* is only rolled and no simultaneous pitch movement is also provided.

It is to be understood that the disclosure is not limited to the exact details of construction, operation, exact materials or embodiments shown and described, as obvious modifications and equivalents will be apparent to one skilled in the art. While the specific embodiments have been illustrated and described, numerous modifications come to mind without significantly departing from the spirit of the disclosure, and the scope of protection is only limited by the scope of the accompanying Claims. For example, instead of coupling the output of the foot-roll actuator assembly 442 to the foot housing 540, the foot-roll actuator assembly 442 may be coupled to the foot housing 540 and the output may be coupled to the shin 406*a*. It should also be understood that substantially utilized herein means a deviation that is less than 15% and preferably less than 5%. It should also be understood that other configuration or arrangements of the above described components is contemplated by this Application.

While the above described components are configured for use with a general purpose humanoid robot, it should be understood that said components may be used with other robots. Examples of other robots include: articulated robot (e.g., an arm having two, six, or ten degrees of freedom, etc.), a cartesian robot (e.g., rectilinear or gantry robots, robots having three prismatic joints, etc.), Selective Compliance Assembly Robot Arm (SCARA) robots (e.g., with a donut shaped work envelope, with two parallel joints that provide compliance in one selected plane, with rotary shafts positioned vertically, with an end effector attached to an arm, etc.), delta robots (e.g., parallel link robots with parallel joint linkages connected with a common base, having direct control of each joint over the end effector, which may be used for pick-and-place or product transfer applications, etc.), polar robots (e.g., with a twisting joint connecting the arm with the base and a combination of two rotary joints and one linear joint connecting the links, having a centrally pivoting shaft and an extendable rotating arm, spherical robots, etc.), cylindrical robots (e.g., with at least one rotary joint at the base and at least one prismatic joint connecting the links, with a pivoting shaft and extendable arm that moves vertically and by sliding, with a cylindrical configuration that offers vertical and horizontal linear movement along with rotary movement about the vertical axis, etc.), self-driving car, a kitchen appliance, construction equipment, or a variety of other types of robot systems. The robot system may include one or more sensors (e.g., cameras, temperature, pressure, force, inductive or capacitive touch), motors (e.g., servomotors and stepper motors), actuators, biasing members, encoders, housing, or any other component known in the art that is used in connection with robot systems.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

It is to be understood that the disclosure is not limited to the exact details of construction, operation, exact materials, or embodiments shown and described, as obvious modifications and equivalents will be apparent to one skilled in the art; for example, the photographs may be digital photographs or paper based photographs that may then be scanned into digital form. While the specific embodiments have been illustrated and described, numerous modifications come to mind without significantly departing from the spirit of the disclosure.

As used herein, the terms "component," "system" and the like in relation to discussions about computer-related processes and systems are intended to refer to a computer-related entity, either hardware, a combination of hardware and software, software, or software in execution. For example, a component may be, but is not limited to being, a process running on a processor, a processor, an object, an instance, an executable, a thread of execution, a program, a computer, or both. By way of illustration, both an application running on a computer and the computer can be a component. One or more components may reside within a process, a thread of execution, or both, and a component may be localized on one computer and/or distributed between two or more computers.

Furthermore, all or portions of the computer-related processes and systems can be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips), optical disks (e.g., compact disk (CD), digital versatile disk (DVD)), smart cards, and flash memory devices (e.g., card, stick, key drive). Additionally, it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Where the above examples, embodiments and implementations reference specific examples (e.g., of robot types or components), it should be understood by those of ordinary skill in the art that other relevant devices and examples could be intermixed or substituted with those provided, consistent with the principles disclosed. In places where the description above refers to particular embodiments of robot ankles, feet, or control methods, it should be readily apparent that a number of modifications may be made without departing from the spirit thereof and that these embodiments and implementations may be applied to other robotic technologies as well. Accordingly, the disclosed subject matter is intended to embrace all such alterations, modifications and variations that fall within the spirit and scope of the disclosure and the knowledge of one of ordinary skill in the art.

The invention claimed is:

1. A humanoid robot comprising:
an upper region including a head, a torso, and a pair of arms coupled to the torso;
a central region coupled to the upper region, and,
a lower region coupled to the central region and spaced apart from the upper region, the lower region including a pair of legs, each leg including:
a thigh coupled to the central region,
a knee coupled to a lower end of the thigh,
a shin coupled to a lower end of the knee,
an ankle assembly coupled to the shin, and
a foot coupled to the ankle assembly,
wherein the ankle assembly includes: (i) a foot-flexion actuator assembly coupled to the shin and configured to control pitch movement of the foot relative to the shin about a pitch pivotal axis, and (ii) a foot-roll actuator assembly: (a) coupled to the shin, (b) including a rotor with an extent that is positioned below the shin, and (c) configured to control roll movement of the foot relative to the shin about a roll pivotal axis; and,
wherein the pitch pivotal axis and the roll pivotal axis do not intersect with one another and remain orthogonal to one another as the foot pivots about the pitch pivotal axis and the roll pivotal axis.

2. The humanoid robot of claim 1, wherein the foot-roll actuator assembly is also coupled to the foot-flexion actuator assembly, and wherein the foot-roll actuator assembly is configured to control roll movement of the foot relative to both the shin and the foot-flexion actuator about the roll pivotal axis.

3. The humanoid robot of claim 1, wherein the roll pivotal axis moves about the pitch pivotal axis as the foot-flexion actuator assembly moves the foot about the pitch pivotal axis.

4. The humanoid robot of claim 1, wherein when the humanoid robot is in an upright standing position: (i) the pitch pivotal axis resides in a first substantially horizontal plane and the roll pivotal axis resides in a second substantially horizontal plane, and (ii) the first plane is located above both the roll pivotal axis and the second plane.

5. The humanoid robot of claim 1, wherein the shin includes an interior cavity, and wherein the foot-flexion actuator assembly includes: (i) an actuator located within the interior cavity, and (ii) a connector rod coupled to the actuator and to the foot-roll actuator assembly and configured to move the foot and the foot-roll actuator assembly about the pitch pivotal axis.

6. The humanoid robot of claim 5, wherein the actuator of the foot-flexion actuator assembly includes: (i) a stator coupled to an extent of the shin in a fixed position, (ii) the rotor configured to rotate about a third pivotal axis and indirectly coupled to the connector rod.

7. The humanoid robot of claim 6, wherein the foot-flexion actuator assembly further includes: (i) a ball screw coupled to the rotor, and (ii) a ball nut slide rotatably coupled to the ball screw and coupled to a carrier, wherein the connector rod is pivotably coupled to the carrier, wherein the ball screw and carrier are configured to travel along the third pivotal axis in response to rotation of the ball screw by the rotor of the foot-flexion actuator assembly and to cause the connector rod to move the foot and the foot-roll actuator assembly about the pitch pivotal axis.

8. The humanoid robot of claim 5, wherein the connector rod is oriented at an angle to the roll pivotal axis within a range of about 60 degrees to about 90 degrees when the humanoid robot is in the upright standing position.

9. The humanoid robot of claim 5, wherein the connector rod has a distal end coupled to the foot-roll actuator assembly, and wherein the distal end is located a non-zero distance from the pitch pivotal axis in a rearward direction.

10. The humanoid robot of claim 1, wherein the foot-roll actuator assembly includes: (i) a housing coupled to the lower end of the shin at the pitch pivotal axis, and (ii) a motor residing within the housing and configured to rotate the foot about the roll pivotal axis.

11. The humanoid robot of claim 10, wherein the housing includes: (i) a motor receptacle housing the motor, and (ii) at least one heat-dissipation fin coupled to an external surface of the motor receptacle to draw heat away from the motor.

12. The humanoid robot of claim 10, wherein the foot includes: (i) a foot housing and (ii) a coupling assembly coupled to the foot housing and to the foot-roll actuator assembly to mount the foot to the foot-roll actuator assembly, and wherein the foot-roll actuator assembly is cantilevered to the coupling assembly.

13. The humanoid robot of claim 1, wherein the knee includes a knee actuator configured to move the shin relative to the thigh about a knee pivotal axis, and
wherein when the robot is in the upright standing position, the knee pivotal axis and the pitch pivotal axis reside in a plane that is oriented perpendicular to the roll pivotal axis to provide a direct load path between the knee pivotal axis and the pitch pivotal axis.

14. The humanoid robot of claim 1, wherein the ankle assembly includes at least one rotation limiter configured to prevent rotation of the foot past a predetermined angular orientation.

15. A humanoid robot comprising:
an upper region including a head, a torso, and a pair of arms coupled to the torso; and
a lower region coupled to the upper region, the lower region including a pair of legs, each leg including:
a thigh,
a knee coupled to a lower end of the thigh,
a shin coupled to a lower end of the knee and formed to have an interior cavity,
an ankle assembly coupled to the shin, and
a foot coupled to the ankle assembly and including a sensor: (i) positioned between a sole and the ankle assembly, and (ii) configured to measure forces between the humanoid robot and a support surface,
wherein the ankle assembly includes a foot-flexion actuator assembly having: (i) an actuator at least partially located within the interior cavity of the shin, and (ii) a connector rod coupled to the actuator and extending downward through the interior cavity toward the foot, the connector rod configured to control pitch movement of the foot relative to the shin about a pitch pivotal axis in response to actuation of the actuator.

16. The humanoid robot of claim 15, wherein the ankle assembly further includes a foot-roll actuator assembly coupled to the shin and configured to control roll movement of the foot relative to the shin about a roll pivotal axis; and,
 wherein the pitch pivotal axis and the roll pivotal axis remain orthogonal to one another as the foot pivots about the pitch pivotal axis and the roll pivotal axis.

17. The humanoid robot of claim 16, wherein the foot-roll actuator assembly is also coupled to the foot-flexion actuator.

18. The humanoid robot of claim 16, wherein the roll pivotal axis moves about the pitch pivotal axis as the and the foot-flexion actuator assembly moves the foot about the pitch pivotal axis.

19. The humanoid robot of claim 16, wherein when the humanoid robot is in the upright standing position: (i) the pitch pivotal axis resides in a first substantially horizontal plane and the roll pivotal axis resides in a second substantially horizontal plane, and (ii) the first plane is located above both the roll pivotal axis and the second plane.

20. The humanoid robot of claim 15, wherein the ankle assembly includes rotation limiters configured to prevent rotation of the foot past predetermined angular orientations.

21. A humanoid robot comprising:
 an upper region including a head, a torso, and a pair of arms coupled to the torso;
 a central region coupled to the upper region, and,
 a lower region coupled to the central region and spaced apart from the upper region, the lower region including a pair of legs, each leg including:

a thigh coupled to the central region,
 a knee coupled to a lower end of the thigh,
 a shin coupled to a lower end of the knee,
 an ankle assembly coupled to the shin, and
 a foot coupled to the ankle assembly,
wherein the ankle assembly includes a foot-roll actuator assembly: (i) with a rotor, and said rotor includes a lower extent positioned between the shin and a portion of the foot, and (ii) configured to control roll movement of the foot relative to the shin about a roll pivotal axis.

22. The humanoid robot of claim 21, wherein the foot-roll actuator assembly includes: (i) a housing coupled to the lower end of the shin at a pitch pivotal axis, (ii) a motor residing within the housing and configured to rotate the foot about the roll pivotal axis.

23. The humanoid robot of claim 22, wherein the housing includes: (i) a motor receptacle housing the motor, and (ii) at least one heat-dissipation fin coupled to an external surface of the motor receptacle to draw heat away from the motor.

24. The humanoid robot of claim 21, wherein the foot includes: (i) a foot housing and (ii) a coupling assembly coupled to the foot housing and to the foot-roll actuator assembly to mount the foot to the foot-roll actuator assembly, and wherein the foot-roll actuator assembly is cantilevered to the coupling assembly.

25. The humanoid robot of claim 22, further comprising rotation limiters coupled to the housing and configured to engage with the foot to prevent rotation of the foot past predetermined angular orientations.

* * * * *